(12) United States Patent
Maezawa et al.

(10) Patent No.: US 7,741,995 B2
(45) Date of Patent: Jun. 22, 2010

(54) METHOD OF ACQUIRING ERROR CORRECTION VALUE OF REFERENCE FREQUENCY, TERMINAL DEVICE, AND RECORDING MEDIUM

(75) Inventors: Hidekazu Maezawa, Nagano (JP); Koichiro Yano, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 316 days.

(21) Appl. No.: 11/847,087

(22) Filed: Aug. 29, 2007

(65) Prior Publication Data
US 2008/0068258 A1 Mar. 20, 2008

(30) Foreign Application Priority Data
Sep. 14, 2006 (JP) .............................. 2006-249455

(51) Int. Cl.
*G01S 1/00* (2006.01)
(52) U.S. Cl. ................................. 342/357.02
(58) Field of Classification Search .............................
342/357.01–357.17
See application file for complete search history.

(56) References Cited

U.S. PATENT DOCUMENTS

| | | | |
|---|---|---|---|
| 5,917,444 A | 6/1999 | Loomis et al. | |
| 6,078,284 A * | 6/2000 | Levanon | 342/357.16 |
| 6,889,052 B2 * | 5/2005 | Geier et al. | 455/456.1 |
| 2003/0214436 A1 | 11/2003 | Voor et al. | |
| 2004/0063411 A1 | 4/2004 | Goldberg et al. | |

FOREIGN PATENT DOCUMENTS

| | | |
|---|---|---|
| EP | 0 561 540 A1 | 9/1993 |
| EP | 1 596 216 A1 | 11/2005 |
| EP | 1 632 784 A1 | 3/2006 |
| JP | H11-513787 A | 11/1999 |
| JP | 2000-131415 A | 5/2000 |
| JP | 2000-506348 A | 5/2000 |
| JP | 2002-228737 A | 8/2002 |
| JP | 2002-274539 A | 9/2002 |
| JP | 2004-289702 A | 10/2004 |
| WO | WO-97/14049 A3 | 4/1997 |
| WO | WO-97/33382 A1 | 9/1997 |

\* cited by examiner

*Primary Examiner*—Thomas H Tarcza
*Assistant Examiner*—Nga X Nguyen
(74) *Attorney, Agent, or Firm*—Global IP Counselors, LLP

(57) ABSTRACT

A terminal device receives satellite signals from a plurality of satellite positioning system (SPS) satellites and locates a position. The terminal device periodically calculates a first drift df1 of a local oscillator using a reference frequency Hr, calculates a search range of the satellite signal using the first drift df1, calculates a second drift df2 of the local oscillator using a reception frequency of the satellite signal, calculates a reference frequency error β which is an error of the reference frequency by calculating a difference between the first drift df1 and the second drift df2, and calculates an error correction value βav of the reference frequency by subjecting a plurality of reference frequency errors β to a statistical process.

12 Claims, 22 Drawing Sheets

FIG. 1
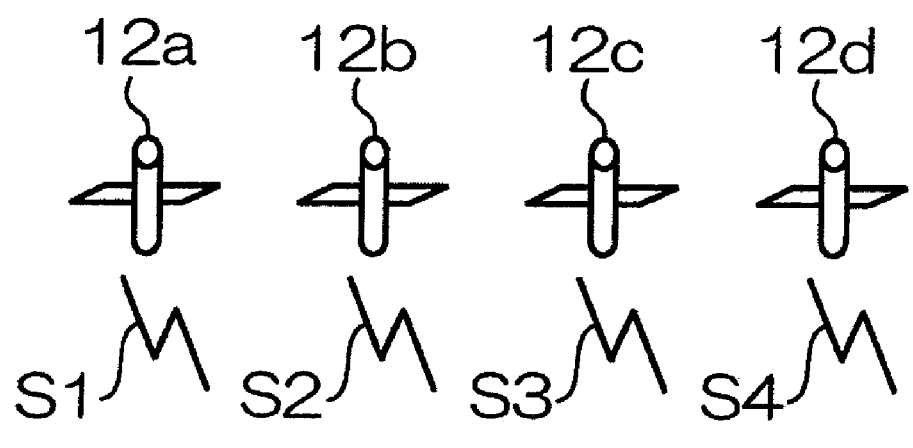
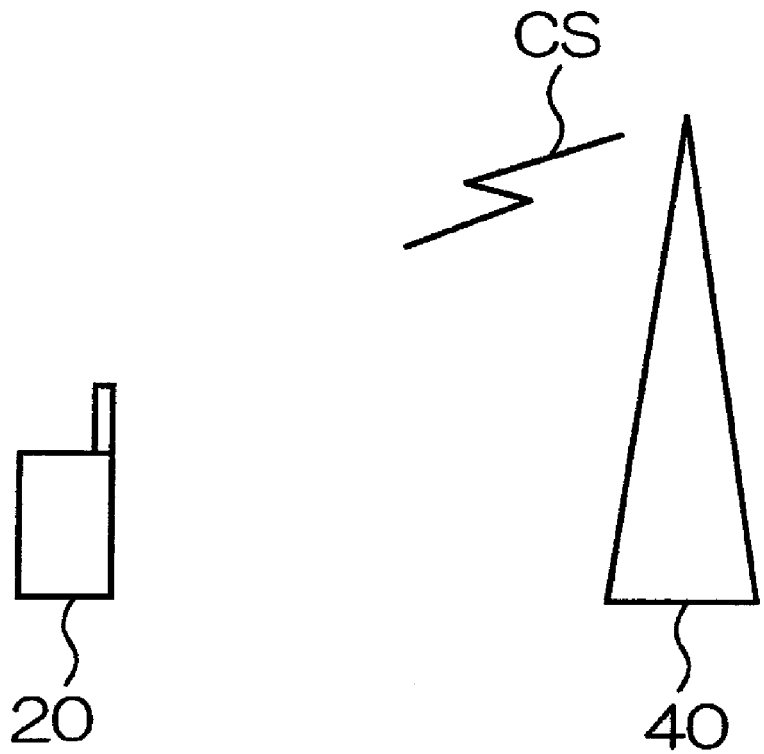

FIG. 7

EXPRESSION 2 : $df1 = (Hr-Hg) / Hr$ $df1$ : FIRST DRIFT $Hr$ : REFERENCE FREQUENCY $Hg$ : POSITIONING-SIDE REFERENCE FREQUENCY

FIG. 8

EXPRESSION 3 : $H1+H2-df1 \times a - \alpha 1 \leqq SR1 \leqq H1+H2+df1 \times a + \alpha 1$ $SR1$ : FIRST SEARCH RANGE $H1$ : TRANSMISSION FREQUENCY $H2$ : DOPPLER SHIFT $b$ : FREQUENCY CONVERSION COEFFICIENT $\alpha 1$ : DRIFT ERROR

FIG. 9

EXPRESSION 4 : Hest = H1+H2

EXPRESSION 5 : df2 = Hst−Hest df2 : SECOND DRIFT

Hst : RECEPTION FREQUENCY OF STRONG SATELLITE SIGNAL

Hest : ESTIMATED RECEPTION FREQUENCY

FIG. 10

EXPRESSION 6 : H1+H2−df2−$\alpha$2 ≤ SR2 ≤ H1+H2+df2+$\alpha$2

SR2 : SECOND SEARCH RANGE

H1 : TRANSMISSION FREQUENCY

H2 : DOPPLER SHIFT $\alpha$2 : DRIFT ERROR

FIG. 11

EXPRESSION 7 : $\beta = df1 - df2$ $\beta$ : VCO ERROR

FIG. 12

EXPRESSION 8 : $\beta av = (\beta(1) + \beta(2) + \beta(3) + \ldots + \beta(n)) / n$ $\beta av$ : VCO CORRECTION VALUE

FIG. 13

BASIC UPDATE : UPDATE USING SECOND DRIFT df2 AND ERROR α2

INTERMEDIATE UPDATE :

FIRST UPDATE : UPDATE USING FIRST DRIFT df1 AND ERROR α1

SECOND UPDATE : UPDATE USING FIRST DRIFT df1, ERROR α1 AND
VCO CORRECTION VALUE βav
H1+H2+df1−α1+βav ≦ SR ≦ H1+H2+df1+α1−βav

EXPRESSION 9 : $\Delta df1 = df1(t) - df1(0)$ $df1(0)$ : INITIALLY CALCULATED $df1$ $df1(t)$ : $df1$ CALCULATED AT TIME $t$

FIG. 29

EXPRESSION 10 : $\beta \text{est} = \beta \text{av} + b\Delta t$ $\beta$ est : ESTIMATED VCO CORRECTION VALUE $\beta$ av : PRECEDING VCO CORRECTION VALUE $\Delta t$ : ELAPSED TIME FROM CALCULATION OF PRECEDING VCO CORRECTION VALUE b : COEFFICIENT SPECIFIED BY SIMULATION CALCULATION

METHOD OF ACQUIRING ERROR CORRECTION VALUE OF REFERENCE FREQUENCY, TERMINAL DEVICE, AND RECORDING MEDIUM

Japanese Patent Application No. 2006-249455 filed on Sep. 14, 2006, is hereby incorporated by reference in its entirety.

BACKGROUND OF THE INVENTION

The present invention relates to a method of acquiring an error correction value of a reference frequency in a terminal device capable of locating a position using a satellite positioning system (SPS), a terminal device, and a recording medium.

A positioning system has been used in practice which locates the present position of a GPS receiver utilizing an SPS such as a global positioning system (GPS) (e.g. JP-A-2000-131415 (FIG. 1 etc.)).

The GPS receiver receives signals (hereinafter called "satellite signals") from four GPS satellites positioned in the sky, for example, and calculates the distance between each GPS satellite and the GPS receiver (hereinafter called "pseudo-range") based on the difference between the time at which the satellite signal is transmitted from each GPS satellite and the time at which the satellite signal reaches the GPS receiver (hereinafter called "delay time"). The GPS receiver calculates the present position of the GPS receiver using the position of each GPS satellite in the satellite orbit and the pseudo-range. The satellite signal includes a coarse/access (C/A) code and information such as a navigation message.

The GPS receiver may calculate the pseudo-range utilizing the code phase of the C/A code carried by the satellite signal. The C/A code is a signal having a bit rate of 1.023 Mbps and a bit length of 1023 bits (=1 msec=300 km). If the initial position of the GPS receiver is known within an error range of 150 km, the number of C/A codes existing between each GPS satellite and the GPS receiver can be estimated. Therefore, the pseudo-range can be calculated by utilizing the fraction portion (code phase) of the C/A code.

In order to receive the satellite signal, the GPS receiver calculates the search center frequency taking into account the carrier frequency of the satellite signal and the Doppler shift caused by the relative movement of each satellite and the GPS receiver. The GPS receiver determines a range with a specific width around the search center frequency to be a search band (hereinafter called "search range").

The GPS receiver down-converts the frequency of the received satellite signal using a clock signal from a reference oscillator (hereinafter called "local oscillator").

However, the local oscillator undergoes a drift. The term "drift" refers to a change in oscillation frequency due to a change in temperature.

When the reception frequency after down-conversion falls outside the search range due to the drift of the local oscillator, the search efficiency may be decreased, or it may be impossible to search for the satellite.

In order to deal with this problem, technology has been proposed which acquires a reference frequency with a high accuracy from a communication base station or the like, and uses the reference frequency to determine the search range (e.g. JP-T-2000-506348, JP-A-2002-228737, and JP-T-11-513787).

However, the reference frequency acquired from the communication base station or the like has an error even through the reference frequency has a high accuracy. The accuracy of the reference frequency is generally lower than the accuracy of the carrier frequency of the satellite signal. Therefore, when calculating the drift using the reference frequency, the search range must be increased for the error of the reference frequency, whereby the search range becomes wide.

SUMMARY

According to one aspect of the invention, there is provided a method of causing a terminal device, which receives satellite signals from a plurality of satellite positioning system (SPS) satellites and locates a position, to acquire an error correction value of a reference frequency, the method comprising:

periodically calculating a first drift of a local oscillator using the reference frequency;

calculating a search range of the satellite signal using the first drift;

calculating a second drift of the local oscillator using a reception frequency of the satellite signal;

calculating a reference frequency error which is an error of the reference frequency by calculating a difference between the first drift and the second drift; and calculating an error correction value of the reference frequency by subjecting a plurality of the reference frequency errors to a statistical process.

BRIEF DESCRIPTION OF THE SEVERAL VIEWS OF THE DRAWING

FIG. 1 is a schematic view showing a terminal and the like according to one embodiment of the invention.

FIG. 7 is a view illustrative of the process based on a first drift calculation program.

FIG. 8 is a view illustrative of the process based on a first search range calculation program.

FIG. 9 is a view illustrative of the process based on a second drift calculation program.

FIG. 10 is a view illustrative of the process based on a second search range calculation program.

FIG. 11 is a view illustrative of the process based on a VCO error calculation program.

FIG. 12 is a view illustrative of the process based on a VCO correction value calculation program.

FIG. 13 is a view illustrative of the process based on a search range update program.

FIG. 29 is a view illustrative of the process based on a VCO correction value estimation program.

DETAILED DESCRIPTION OF THE EMBODIMENT

Figure 2:
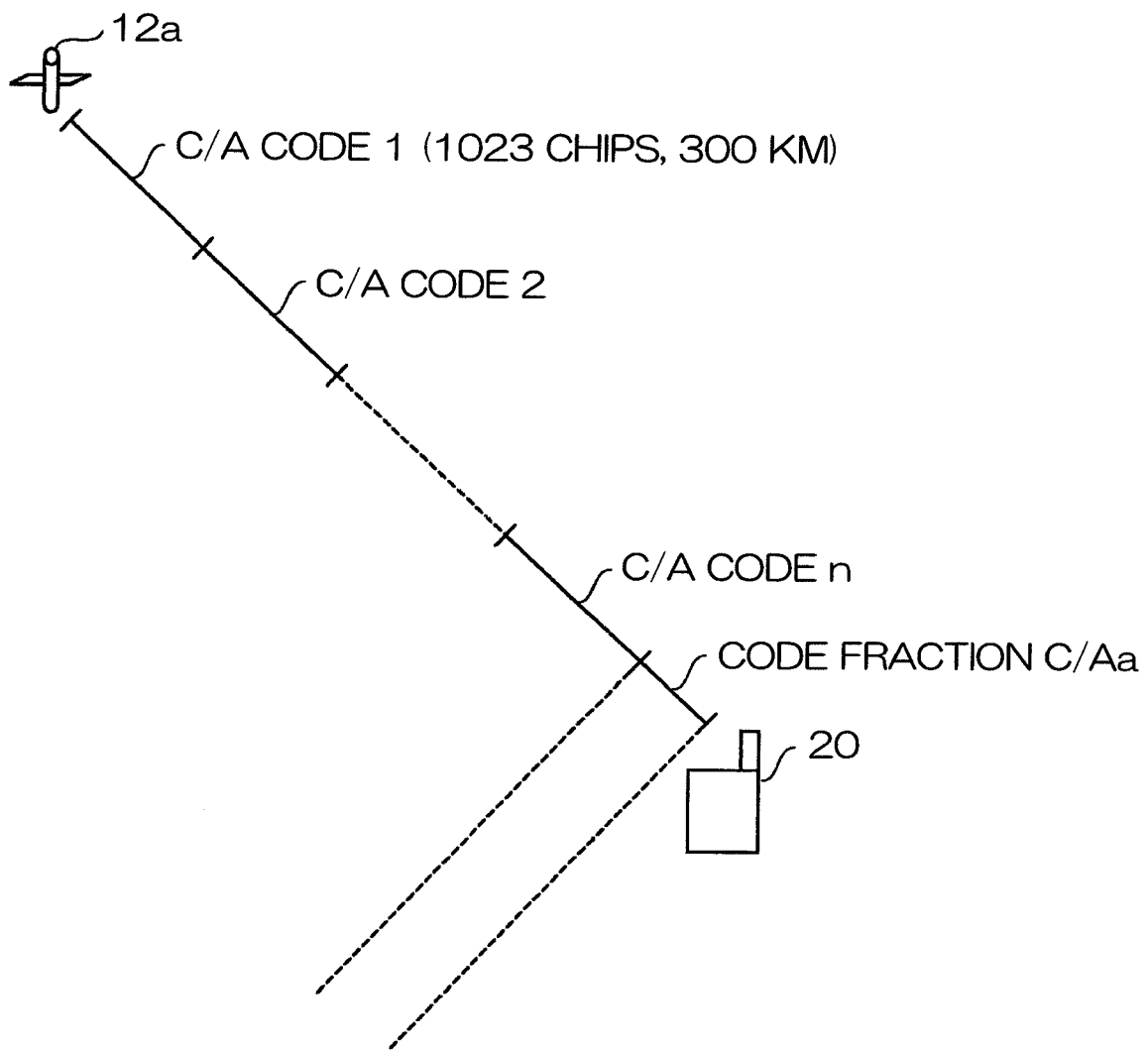
FIG. 2 is a schematic view showing an example of a positioning method.

The invention may provide a method of acquiring a highly accurate error correction value of a reference frequency which enables a search range to be made narrow in comparison with the related-art technology, a terminal device, and a recording medium.

According to one embodiment of the invention, there is provided a method of causing a terminal device, which receives satellite signals from a plurality of satellite positioning system (SPS) satellites and locates a position, to acquire an error correction value of a reference frequency, the method comprising:

periodically calculating a first drift of a local oscillator using the reference frequency;

calculating a search range of the satellite signal using the first drift;

calculating a second drift of the local oscillator using a reception frequency of the satellite signal;

calculating a reference frequency error which is an error of the reference frequency by calculating a difference between the first drift and the second drift; and calculating an error correction value of the reference frequency by subjecting a plurality of the reference frequency errors to a statistical process.

According to this method, the first drift of the local oscillator can be periodically calculated using the reference frequency. The first drift includes the error of the reference frequency.

The second drift of the local oscillator can be calculated using the reception frequency of the satellite signal. Since the second drift is not calculated using the reference frequency, the second drift does not include the error of the reference frequency.

The reference frequency error can be calculated by calculating the difference between the first drift and the second drift. Since the second drift and the first drift differ by the error of the reference frequency, the difference between the first drift and the second drift indicates the reference frequency error.

The error correction value can be calculated by subjecting the reference frequency errors to the statistical process. The error during the calculation process of the reference frequency error can be reduced by the statistical process, whereby the error correction value has a high accuracy.

This enables acquisition of a highly accurate error correction value of the reference frequency which enables the search range to be made narrow in comparison with the related-art technology.

The method may comprise:

correcting the first drift by subjecting a plurality of the first drifts to a statistical process;

wherein the reference frequency error may be calculated by calculating a difference between the corrected first drift and the second drift.

According to this feature, since the first drift is corrected, the effects of the error during the calculation process of the first drift can be reduced.

Since the difference between the corrected first drift and the second drift is calculated when calculating the reference frequency error, the accuracy of the error correction value can be further improved.

In the method, the first drift may be corrected by generating a regression line based on a plurality of the first drifts, and calculating the first drift on the regression line corresponding to a present time.

According to one embodiment of the invention, there is provided a terminal device which receives satellite signals from a plurality of satellite positioning system (SPS) satellites and locates a position, the terminal device comprising:

a first drift calculation section which periodically calculates a first drift of a local oscillator using a reference frequency;

a search range calculation section which calculates a search range of the satellite signal using the first drift;

a second drift calculation section which calculates a second drift of the local oscillator using a reception frequency of the satellite signal;

a reference frequency error calculation section which calculates a reference frequency error which is an error of the reference frequency by calculating a difference between the first drift and the second drift; and an error correction value calculation section which calculates an error correction value of the reference frequency by subjecting a plurality of the reference frequency errors to a statistical process.

This enables acquisition of a highly accurate error correction value of the reference frequency which enables the search range to be made narrow in comparison with the related-art technology in the same manner as the above embodiment.

The terminal device may comprise:

a first drift correction section which corrects the first drift by subjecting a plurality of the first drifts to a statistical process;

wherein the reference frequency error calculation section may calculate the reference frequency error by calculating a difference between the corrected first drift and the second drift.

In the terminal device, the first drift correction section may correct the first drift by generating a regression line based on a plurality of the first drifts, and calculating the first drift on the regression line corresponding to a present time.

According to one embodiment of the invention, there is provided a computer-readable recording medium storing a program for a computer included in a terminal device which receives satellite signals from a plurality of satellite positioning system (SPS) satellites and locates a position, the program causing the computer to:

periodically calculate a first drift of a local oscillator using a reference frequency;

calculate a search range of the satellite signal using the first drift;

calculate a second drift of the local oscillator using a reception frequency of the satellite signal;

calculate a reference frequency error which is an error of the reference frequency by calculating a difference between the first drift and the second drift; and calculate an error correction value of the reference frequency by subjecting a plurality of the reference frequency errors to a statistical process.

This enables acquisition of a highly accurate error correction value of the reference frequency which enables the search range to be made narrow in comparison with the related-art technology in the same manner as the above embodiment.

In the recording medium, the program may cause the computer to correct the first drift by subjecting a plurality of the first drifts to a statistical process; and the reference frequency error may be calculated by calculating a difference between the corrected first drift and the second drift.

In the recording medium, the first drift may be corrected by generating a regression line based on a plurality of the first drifts, and calculating the first drift on the regression line corresponding to a present time.

Preferred embodiments of the invention are described below in detail with reference to the drawings.

The following embodiments illustrate specific preferred examples of the invention and are provided with various technologically preferred limitations. Note that the scope of the invention is not limited to the following embodiments unless otherwise indicated.

FIG. 1 is a schematic view showing a terminal 20 and the like according to one embodiment of the invention.

As shown in FIG. 1, the terminal 20 can receive signals S1 to S4 from GPS satellites 12a to 12d. The terminal 20 exemplifies a terminal device.

The GPS satellite may be simply called "satellite".

The terminal 20 can receive a communication signal CS from a communication base station 40 to communicate with the communication base station 40. The terminal 20 can communicate with another terminal (not shown) through the communication base station 40.

In this specification, the carrier frequency of the communication signal CS has a specific accuracy.

The GPS satellites 12a and the like exemplify an SPS satellite. The signals S1 and the like exemplify a satellite signal. The signal S1 includes a C/A code. The C/A code is a pseudorandom noise code (hereinafter called "PN code"). The C/A code is a signal having a bit rate of 1.023 Mbps and a bit length of 1023 bits (=1 msec). The C/A code includes 1023 chips. The terminal 20 locates the present position using the C/A code.

The terminal 20 is a portable telephone, a personal handyphone system (PHS), a personal digital assistance (PDA), or the like. Note that the terminal 20 is not limited thereto.

The SPS is not limited to the GPS. The SPS may be the Galileo, the quasi-zenith satellite system, or the like.

FIG. 2 is a schematic view showing an example of a positioning method.

FIG. 2 shows a positioning method using a code phase.

As shown in FIG. 2, it may be considered that the C/A codes continuously line up between the GPS satellite 12a and the terminal 20, for example. Since the distance between the GPS satellite 12a and the terminal 20 is not necessarily a multiple of the length (300 kilometers (km)) of the C/A code, a code fraction C/Aa may exist. Specifically, a portion of a multiple of the C/A code and a fraction portion may exist between the GPS satellite 12a and the terminal 20. The total length of the portion of a multiple of the C/A code and the fraction portion is the pseudo-range. The terminal 20 locates the position using the pseudo-ranges for three or more GPS satellites 12a and the like.

In this specification, the fraction portion C/Aa of the C/A code is called a code phase. The code phase may be indicated by the number of the chip of the 1023 chips of the C/A code, or may be converted into distance, for example. When calculating the pseudo-range, the code phase is converted into distance.

The position of the GPS satellite 12a in the orbit can be calculated using an ephemeris. The ephemeris is information indicating the precise orbit of the GPS satellite 12a. The portion of a multiple of the C/A code can be specified by calculating the distance between the position of the GPS satellite 12a in the orbit and an initial position Q0 described later, for example. Since the length of the C/A code is 300 kilometers (km), the position error of the initial position Q0 must be 150 kilometers (km) or less.

The terminal 20 performs a correlation process while changing the code phase of a C/A code replica of the terminal 20 and a search frequency. The correlation process includes a coherent process and an incoherent process described later.

The code phase at which the correlation cumulative value becomes maximum is the code phase of the code fraction C/Aa.

FIGS. 3A, 3B, 4A, and 4B are views illustrative of the correlation process.

The coherent process is a process of correlating the C/A code received by the terminal 20 with the C/A code replica. The C/A code replica is a code generated by the terminal 20.

Figure 3A:
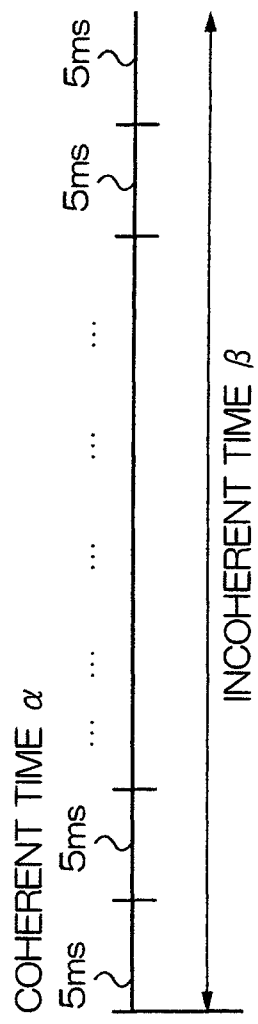
FIGS. 3A and 3B are views illustrative of a correlation process.

As shown in FIG. 3A, when the coherent time is 5 msec, the terminal 20 calculates the correlation value between the C/A code synchronously accumulated over 5 msec and the C/A code replica, for example. The correlated phase (code phase) and the correlation value are output as a result of the coherent process.

The incoherent process is a process of calculating a correlation cumulative value (incoherent value) by accumulating the correlation values as the coherent results.

The code phase output by the coherent process and the correlation cumulative value are output as a result of the correlation process.

Figure 3B:
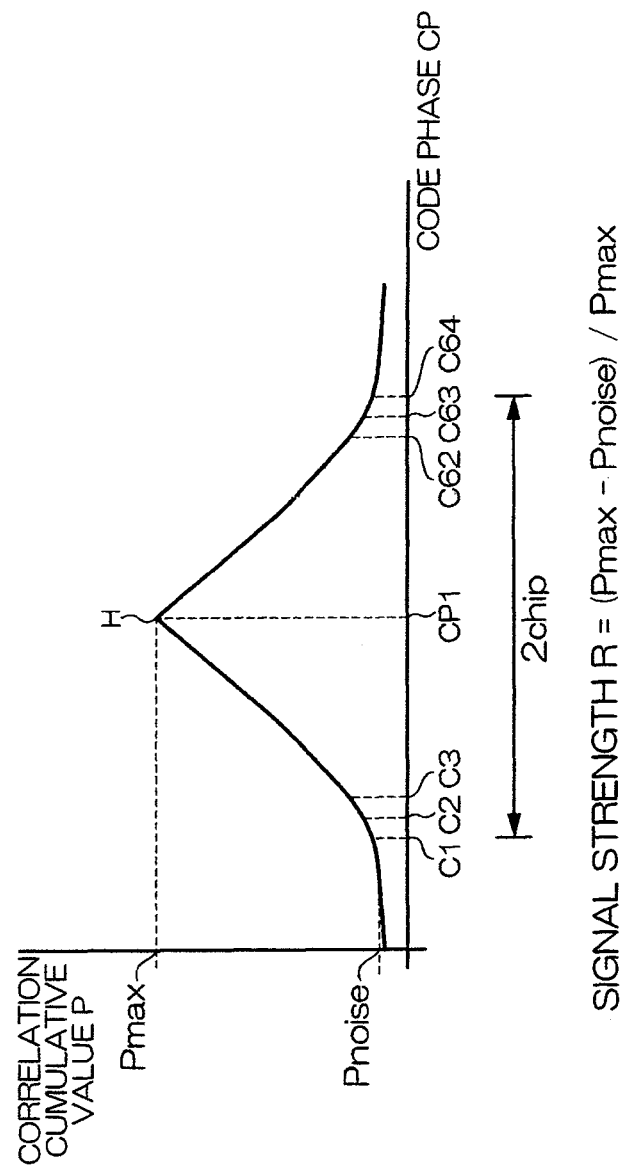

As shown in FIG. 3B, a code phase CP1 corresponding to the maximum value Pmax of the correlation cumulative value P is the code phase of the code phase fraction portion C/Aa (see FIG. 2).

Figure 4A:
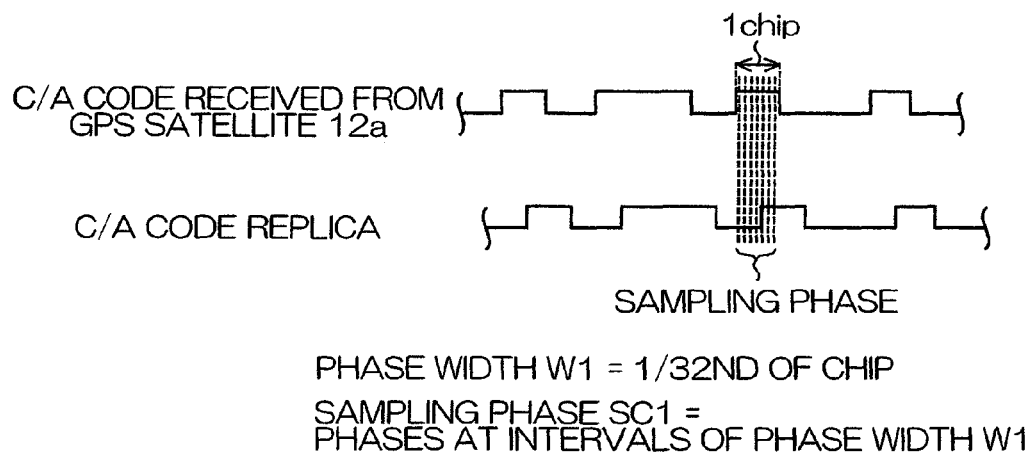
FIGS. 4A and 4B are views illustrative of a correlation process.

As shown in FIG. 4A, the terminal 20 equally divides one chip of the C/A code, for example, and performs the correlation process. For example, the terminal 20 equally divides one chip of the C/A code into 32 sections. Specifically, the terminal 20 performs the correlation process at intervals of a phase width of 1/32nd of the chip (phase width W1).

Figure 4B:
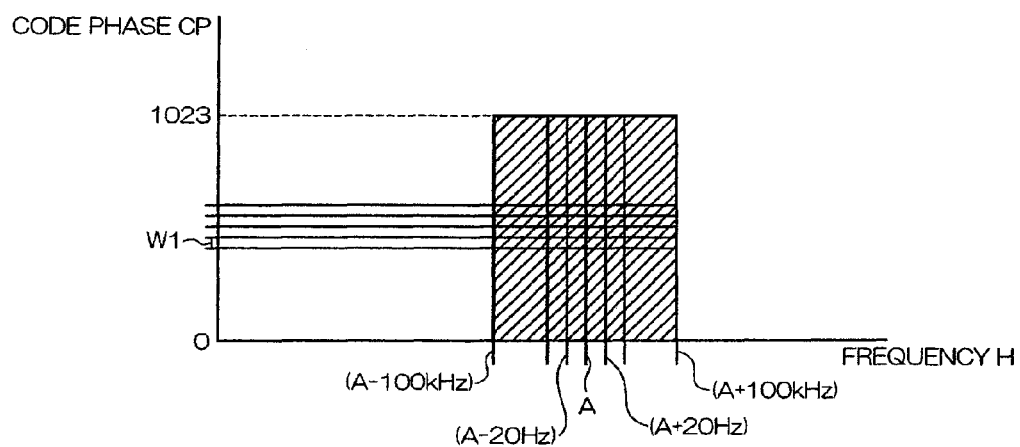

As shown in FIG. 4B, the terminal 20 searches for the first chip to the 1023rd chip of the C/A code, for example.

In this case, the terminal 20 searches for the signals S1 and the like around a search center frequency A within a frequency range with a specific width. For example, the terminal 20 searches for the signals S1 and the like at a frequency step of 20 Hz within the range from (A−100) kHz to (A+100) kHz.

The GPS receiver generally calculates the search center frequency A by adding a Doppler shift (estimated Doppler frequency) H2 to a transmission frequency H1 from the GPS satellites 12a and the like, and adding a drift DR to the resulting value. The transmission frequency H1 from the GPS satellites 12a and the like is known (e.g. 1575.42 MHz). The term "drift DR" refers to a change in oscillation frequency of a reference oscillator of the GPS receiver due to a change in temperature.

The Doppler shift occurs due to the relative movement of each of the GPS satellites 12a and the like and the GPS receiver. The GPS receiver calculates the radial velocity (velocity in the direction of the terminal 20) of each of the GPS satellites 12a and the like at the present time using the ephemeris. The GPS receiver calculates the estimated Doppler frequency H2 based on the radial velocity.

The GPS receiver calculates the search center frequency A in units of the GPS satellites 12a and the like.

(Main Hardware Configuration of Terminal 20)

Figure 5:
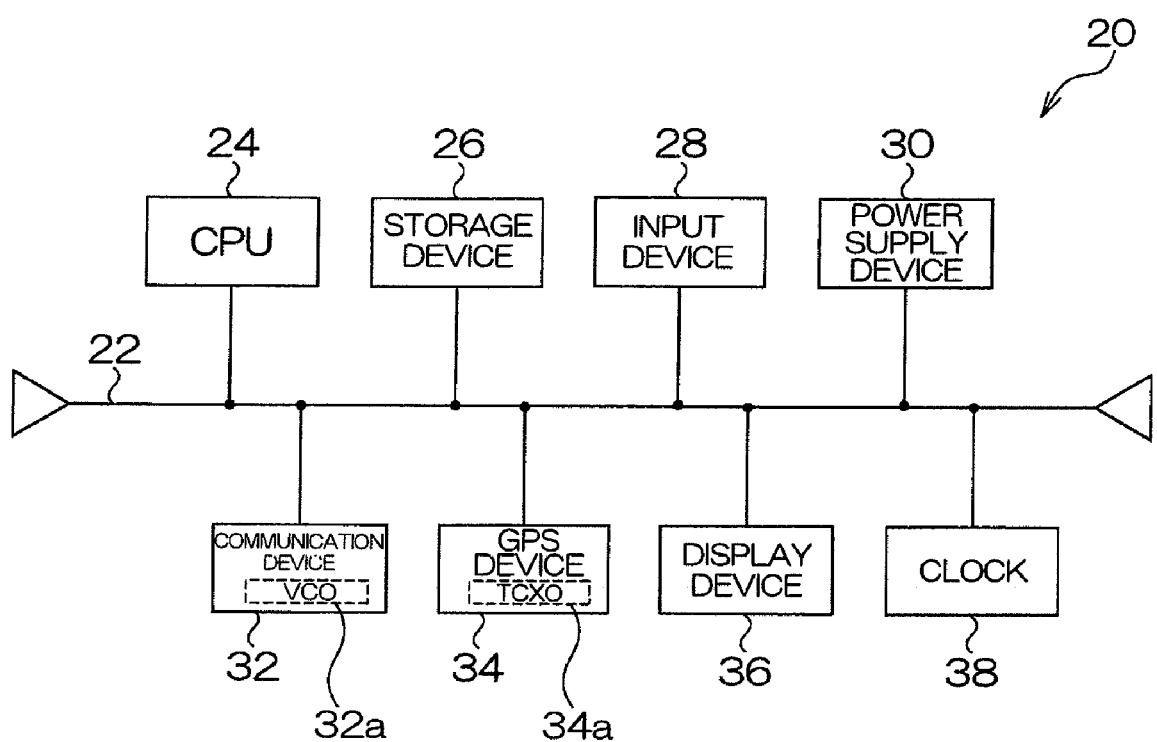
FIG. 5 is a schematic view showing the main hardware configuration of the terminal.

FIG. 5 is a schematic view showing the main hardware configuration of the terminal 20.

As shown in FIG. 5, the terminal 20 includes a computer which includes a bus 22.

A central processing unit (CPU) 24 and a storage device 26 are connected with the bus 22. The storage device 26 is a random access memory (RAM), a read only memory (ROM), or the like.

An input device 28 for receiving various types of information and instructions, a power supply device 30, a communication device 32 for transmitting and receiving a communication signal to and from the communication base stations 40, a GPS device 34 for receiving the signals S1 and the like from the GPS satellites 12a and the like, and a display device 36 for displaying various types of information are also connected with the bus 22.

The communication device 32 includes a voltage controlled oscillator (VCO) 32a. When the communication device 32 communicates with the base station 40, the frequency of the VCO 32a is corrected utilizing the carrier frequency of the communication signal CS from the base station 40. The frequency of the VCO 32a may be corrected using a method disclosed in JP-T-2000-506348, for example.

Therefore, the frequency of the VCO 32a has an accuracy almost the same as that of the carrier frequency of the communication signal CS.

The terminal 20 uses the frequency of the VCO 32a as a reference frequency Hr.

The carrier frequency of the communication signal CS has a specific accuracy, but has a specific error. Therefore, the reference frequency Hr which is the frequency of the VCO 32a has an error equal to that of the carrier frequency of the communication signal CS.

The error of the reference frequency Hr is larger than the error of the carrier frequency of the signal S1 or the like.

The GPS device 34 includes a local oscillator 34a. The local oscillator 34a is a temperature-compensated crystal oscillator (TCXO) for generating a reference clock signal of the GPS device 34, for example.

A clock 38 is also connected with the bus 22.

(Main Hardware Configuration of Terminal 20)

Figure 6:
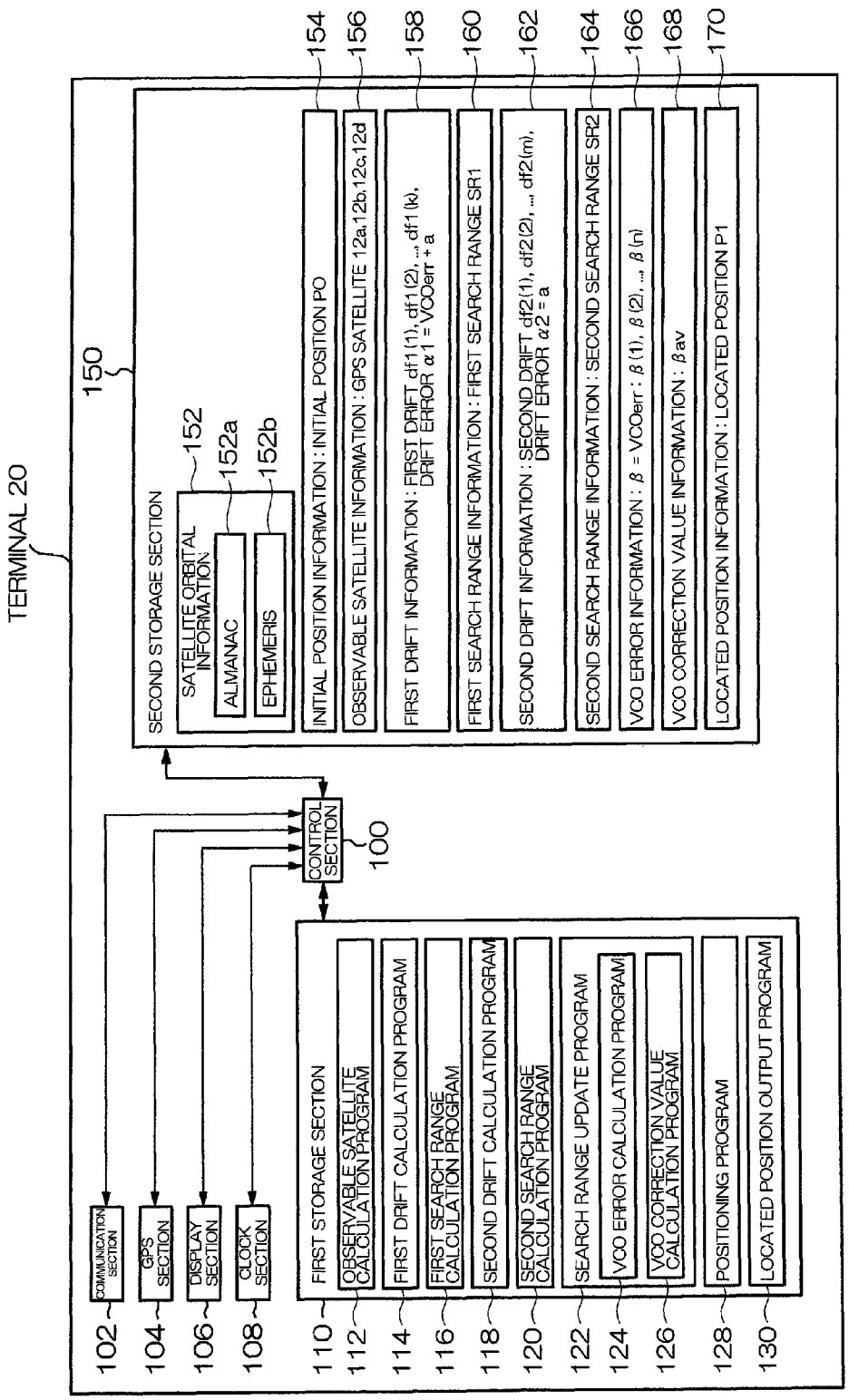
FIG. 6 is a schematic view showing the main software configuration of the terminal.

FIG. 6 is a schematic view showing the main software configuration of the terminal 20.

As shown in FIG. 6, the terminal 20 includes a control section 100 which controls each section, a communication section 102 corresponding to the communication device 32 shown in FIG. 5, a GPS section 104 corresponding to the terminal GPS device 34, a display section 106 corresponding to the display device 36, a clock section 108 corresponding to the clock 38, and the like.

The terminal 20 also includes a first storage section 110 which stores various programs, and the second storage section 150 which stores various types of information.

As shown in FIG. 6, the terminal 20 stores satellite orbital information 152 in the second storage section 150. The satellite orbital information 152 includes an almanac 152a indicating the approximate orbits of all of the GPS satellites 12a and the like, and an ephemeris 152b indicating the precise orbit of each of the GPS satellites 12a and the like. The terminal 20 acquires the almanac 152a and the ephemeris 152b by receiving the signals S1 and the like from the GPS satellites 12a and the like and decoding the received signals.

The terminal 20 uses the satellite orbital information 152 for positioning based on the signals S1 and the like.

As shown in FIG. 6, the terminal 20 stores initial position information 154 in the second storage section 150. The initial position information 154 is information indicating the initial position P0. The initial position P0 is the position located during the preceding positioning, for example.

As shown in FIG. 6, the terminal 20 stores an observable satellite calculation program 112 in the first storage section 110. The observable satellite calculation program 112 is a program for causing the control section 100 to determine the GPS satellites 12a and the like which can be observed at the present time measured by the clock section 108 referring to the almanac 152a.

Specifically, the control section 100 determines the GPS satellites 12a and the like which can be observed at the present time with respect to the initial position P0 based on the almanac 152a.

The control section 100 stores observable satellite information 156 indicating the determined GPS satellites 12a and the like in the second storage section 150.

As shown in FIG. 6, the terminal 20 stores a first drift calculation program 114 in the first storage section 110. The first drift calculation program 114 is a program for causing the control section 100 to calculate the drift of the local oscillator 34a (see FIG. 5) using the frequency of the VCO 32a as the reference frequency Hr. The drift calculated using the reference frequency Hr is called a first drift df1. Specifically, the first drift calculation program 114 and the control section 100 function as a first drift calculation section.

The frequency of the local oscillator 34a is called a positioning-side reference frequency Hg.

FIG. 7 is a view illustrative of the process based on the first drift calculation program 114.

The control section 100 calculates the first drift df1 according to an expression 2 by dividing the difference between the reference frequency Hr and the positioning-side reference frequency Hg by the reference frequency Hr, for example.

The control section 100 stores first drift information 158 indicating the calculated first drift df1 in the second storage section 150.

The error of the first drift df1 (hereinafter called "drift error α1") is a fixed value. The drift error α1 is a value obtained by tests in the development stage of the terminal 20. The first drift information 158 includes the drift error α1.

The drift error α1 is specified as a value including a frequency error VCOerr of the VCO 32a and an avoidable error a during the calculation process.

The control section 100 calculates the first drift df1 at predetermined time intervals during positioning. The term "during positioning" is synonymous with the term "during operation of the GPS device 34". The control section 100 stores the calculated first drifts df1 in the second storage section 150 as the first drift information 158. Therefore, the first drift information 158 indicates k first drifts df1 (i.e., first drifts df1(1), df1(2), df1(3), . . . , df1(k)), for example.

The control section 100 holds only the first drifts df1 calculated within a specific period of time from the present time. Specifically, the first drift df1 has a valid period. The valid period is specified by the positioning duration. When the positioning duration is 120 seconds (s), the valid period of the first drift df1 is also 120 seconds (s).

The control section 100 deletes the first drift df1 of which the valid period (120 seconds (s)) has expired from the first drift information 158.

As shown in FIG. 6, the terminal 20 stores a first search range calculation program 116 in the first storage section 110. The first search range calculation program 116 is a program for causing the control section 100 to calculate the search range of each of the signals S1 and the like using the first drift df1. Specifically, the first search range calculation program 116 and the control section 100 function as a first search range calculation section.

After the control section 100 has calculated a first search range SR1, the control section 100 again calculates the first search range SR1 only when updating the search range using the first drift df1 according to a search range update program 122 described later.

FIG. 8 is a view illustrative of the process based on the first search range calculation program 116.

The control section 100 calculates the first search range SR1 according to an expression 3 in units of the GPS satellites 12a and the like based on the transmission frequency H1 of the signal S1 or the like, the Doppler shift H2, the frequency obtained by multiplying the first drift df1 by a frequency conversion coefficient b, and the drift error α1.

The control section 100 stores first search range information 160 indicating the calculated first search range SR1 in the second storage section 150.

As shown in FIG. 6, the terminal 20 stores a second drift calculation program 118 in the first storage section 110. The second drift calculation program 118 is a program for causing the control section 100 to calculate the drift of the local oscillator 34a (see FIG. 5) using a reception frequency Hst of the signal S1 or the like. The drift calculated using the reception frequency Hst is called a second drift df2. Specifically, the second drift calculation program 118 and the control section 100 function as a second drift calculation section.

FIG. 9 is a view illustrative of the process based on the second drift calculation program 118.

The control section 100 calculates the second drift df2 using a strong signal from a strong satellite among the received signals S1 and the like. The term "strong satellite" refers to a satellite corresponding to a signal strength of −150 dBm or more, for example.

The control section 100 calculates an estimated reception frequency Hest according to an expression 4 based on the transmission frequency H1 of the signal S1 or the like and the Doppler shift H2.

The control section 100 then calculates the second drift df2 according to an expression 5 by calculating the difference between the reception frequency Hst and the estimated reception frequency Hest.

The control section 100 stores second drift information 162 indicating the calculated second drift df2 in the second storage section 150.

The control section 100 calculates the second drift df2 when the terminal 20 has received a signal from the strong satellite or the positioning calculation has converged. The control section 100 calculates the second drift df2 at irregular time intervals. The time interval at which the control section 100 calculates the second drift df2 is usually longer than the time interval at which the control section 100 calculates the first drift df1. In this embodiment, the following description is given on the assumption that the time interval at which the control section 100 calculates the second drift df2 is longer than the time interval at which the control section 100 calculates the first drift df1.

The second drift information 162 includes a drift error α2.

The error of the second drift df2 (hereinafter called "drift error α2") is a fixed value. The drift error α2 is a value obtained in the development stage of the terminal 20. The drift error α2 is specified as a value smaller than the drift error α1.

This is because the accuracy of the estimated reception frequency Hest is higher than the accuracy of the reference frequency Hr.

Since the reference frequency Hr is not used to calculate the drift error α2, the error VCOerr of the reference frequency is not included in the drift error α2. Therefore, the drift error α2 includes only the error a during the calculation process.

As shown in FIG. 6, the terminal 20 stores a second search range calculation program 120 in the first storage section 110. The second search range calculation program 120 is a program for causing the control section 100 to calculate the search range of each of the signals S1 and the like using the second drift df2.

FIG. 10 is a view illustrative of the process based on the second search range calculation program 120.

The control section 100 calculates a second search range SR2 according to an expression 6 in units of the GPS satellites 12a and the like based on the transmission frequency H1 of the signal S1 or the like, the Doppler shift H2, the second drift df2, and the drift error α2.

The control section 100 stores second search range information 164 indicating the calculated second search range SR2 in the second storage section 150.

As shown in FIG. 6, the terminal 20 stores a search range update program 122 in the first storage section 110. The search range update program 122 is a program for causing the control section 100 to update the search range.

The search range update program 122 includes a VCO error calculation program 124 and a VCO correction value calculation program 126.

FIG. 11 is a view illustrative of the process based on the VCO error calculation program 124.

As shown in FIG. 11, the control section 100 calculates the difference β (VCO error β) between the first drift df1 and the second drift df2. The VCO error β is the frequency error (VCOerr) of the VCO 32a (see FIG. 5). Specifically, the VCO error β exemplifies a reference frequency error. The VCO error calculation program 124 and the control section 100 function as a reference frequency error calculation section.

The control section 100 calculates the VCO error β which is the difference between the second drift df2 and the latest first drift df1 each time the control section 100 calculates the second drift df2. For example, when the latest first drift df1 is the first drift df1(n), the control section 100 calculates the difference between the second drift df2 and the first drift df1(n).

The control section 100 stores VCO error information 166 indicating the VCO error β in the second storage section 150.

The VCO error β determined by a simulation was about 0.3 ppm at the maximum.

FIG. 12 is a view illustrative of the process based on the VCO correction value calculation program 126.

As shown in FIG. 12, the control section 100 calculates a VCO correction value βav by calculating the average value of the differences β(1) to β(n).

The process of calculating the average value exemplifies a statistical process. The VCO correction value calculation program 126 and the control section 100 exemplify an error correction value calculation section.

The control section 100 stores VCO correction value information 168 indicating the VCO correction value βav in the second storage section 150.

The VCO correction value βav determined by a simulation was about 0.05 ppm.

Figure 14:
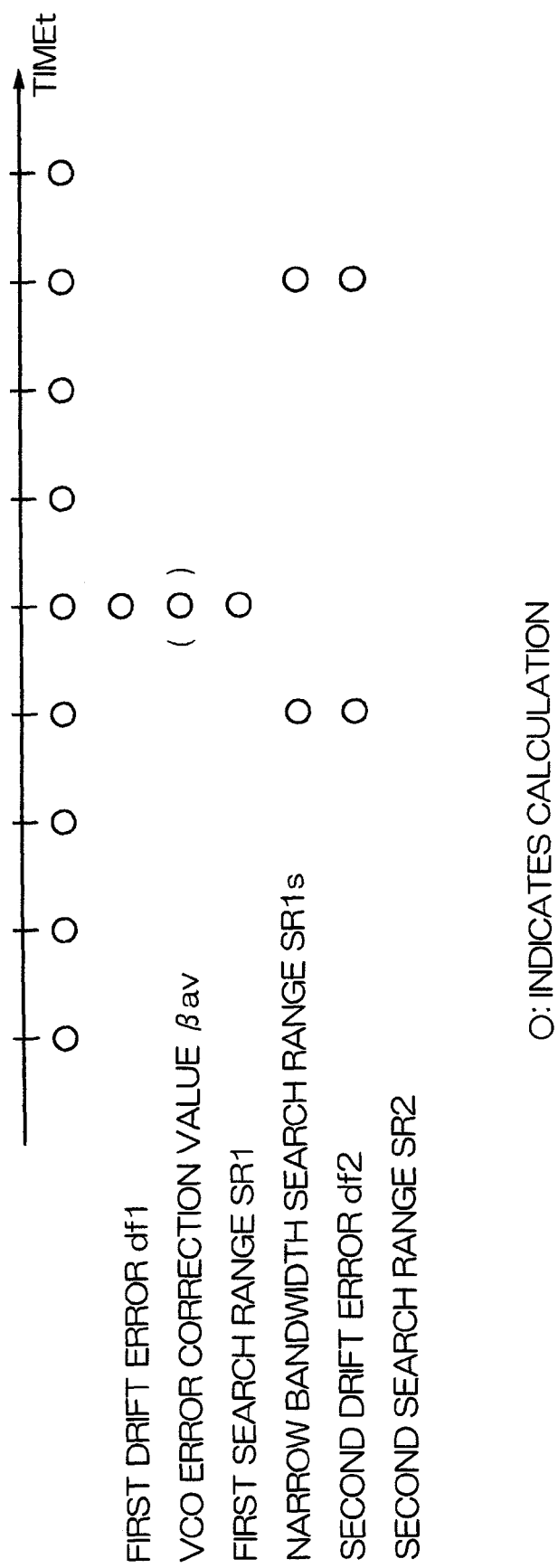
FIG. 14 is another view illustrative of the process based on the search range update program.

FIGS. 13 and 14 are views illustrative of the process based on the search range update program 122.

As shown in FIG. 13, the control section 100 updates the search range by a basic update operation or an intermediate update operation. The intermediate update operation includes a first update operation and a second update operation.

The basic update operation refers to an update method in which the search range is calculated according to the second search range calculation program 120 and used as a new search range.

The first update operation refers to an update method in which the search range is calculated according to the first search range calculation program 116 and used as a new search range.

The second update operation refers to an update method in which the search range is updated using the first drift df1, the error α1, and the VCO correction value βav.

The search range updated by the second update operation is narrower than the search range calculated by the first update operation.

As shown in FIG. 14, the control section 100 necessarily performs the basic update operation when the control section 100 has calculated the second drift df2.

The control section 100 performs the first update operation or the second update operation between the basic update operations when a specific condition is satisfied.

Figure 15:
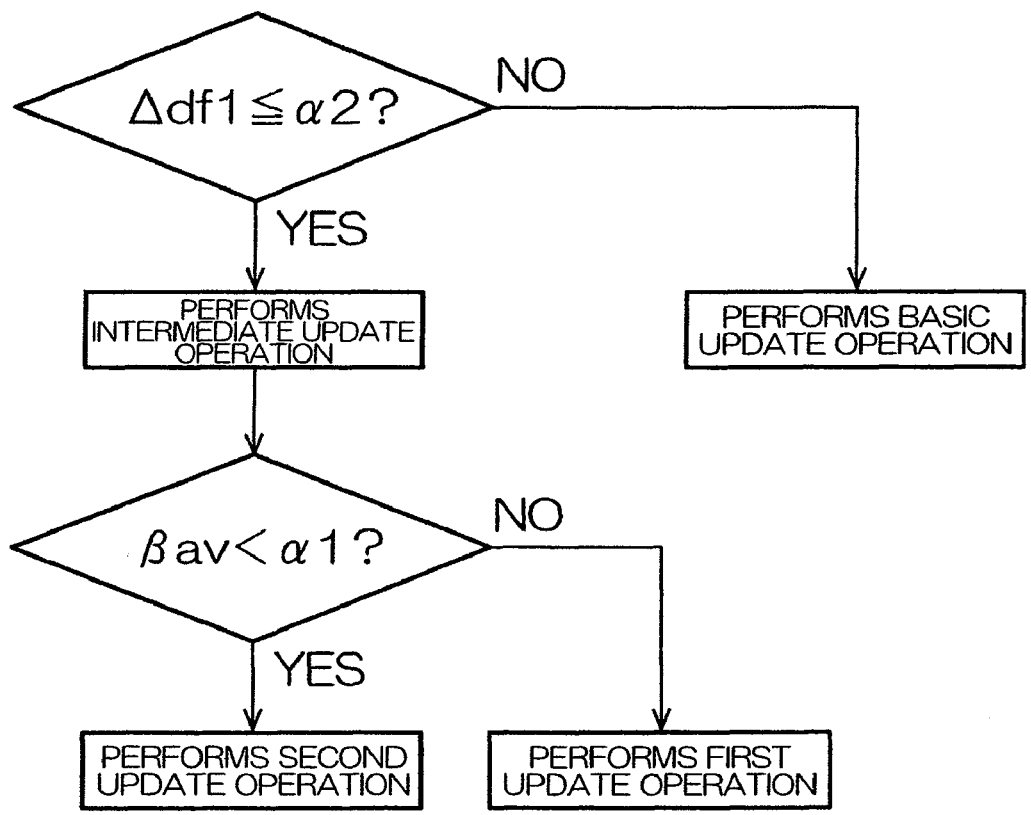
FIG. 15 is another view illustrative of the process based on the search range update program.

FIG. 15 is a view illustrative of a condition whereby the control section 100 performs the intermediate update operation.

As shown in FIG. 15, the control section 100 calculates the amount of change Δdf1 in the drift df1 using an expression 9. Specifically, the control section 100 calculates the amount of change Δdf1 which is the difference between the initially calculated first drift df1(0) and the first drift df1(t) calculated at a time t. The amount of change Δdf1 is the cumulative value (or total value) of the amount of change in the drift after the first drift df1 has been initially calculated.

The control section 100 determines whether or not the amount of change Δdf1 is larger than the drift error α2 of the second drift df2.

When the control section 100 has determined that the amount of change Δdf1 is larger than the drift error α2, the control section 100 calculates the first search range SR1 using the first drift df1, and sets the first search range SR1 to be a new search range.

The condition whereby the amount of change Δdf1 is larger than the drift error α2 is called an intermediate update operation execution condition.

The control section 100 may calculate the change rate of the first drift df1 and calculate the amount of change Δdf1 based on the change rate and the elapsed time, differing from this embodiment. The control section 100 may update the change rate at predetermined time intervals.

The control section 100 performs the second update operation when the VCO correction value βav is smaller than the error α1 of the first drift. The control section 100 performs the first update operation when the VCO correction value βav is equal to or larger than the error α1 of the first drift.

The advantages of the search range update method according to this embodiment are described below with reference to FIGS. 16 to 22.

Figure 16:
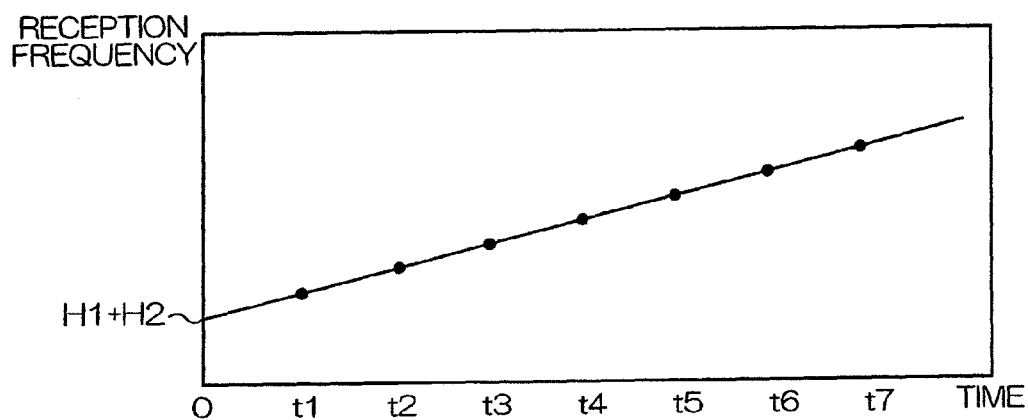
FIG. 16 is another view illustrative of the process based on the search range update program.

As shown in FIG. 16, the reception frequency (reception frequency down-converted in the terminal 20) changes with the passage of time. This is because the temperature changes with the passage of time after the GPS device 34 has been activated, whereby the drift of the local oscillator 34a changes.

FIG. 16 and the like show a state in which the reception frequency changes linearly for convenience of illustration. Note that the reception frequency does not necessarily changes linearly in the actual situation.

Figure 17:
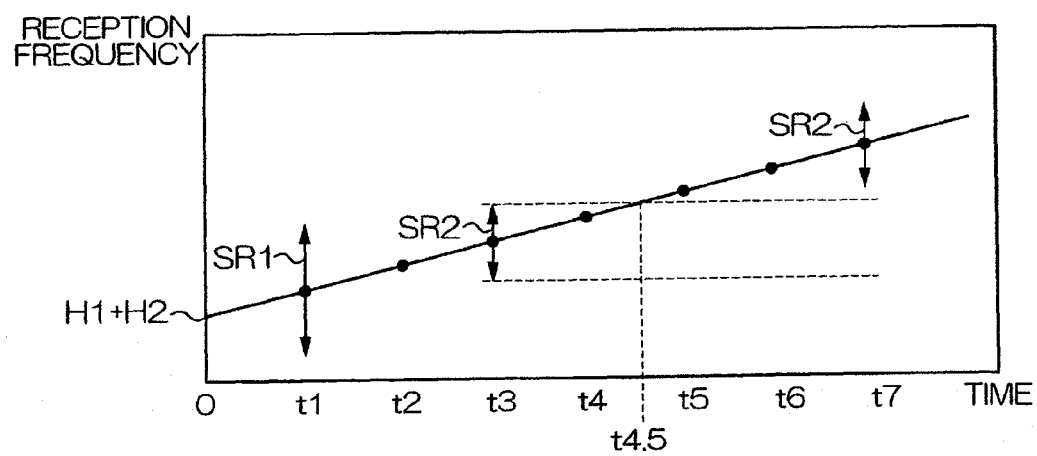
FIG. 17 is another view illustrative of the process based on the search range update program.

As shown in FIG. 17, the control section 100 calculates the first drift df1 at a time t1, and sets the first search range SR1. At a time t3, the control section 100 calculates the second drift df2, calculates the second search range SR2, and sets the second search range SR2 to be a new search range.

The control section 100 again calculates the second drift df2 at a time t7.

In this case, the reception frequency falls outside the search range SR2 set at the time t3 depending on the amount of change in the drift.

In the example shown in FIG. 17, the reception frequency falls outside the search range SR2 at a time t4.5. Therefore, the terminal 20 cannot receive the signals S1 and the like during a period between the time t4.5 and the time t7.

Figure 18:
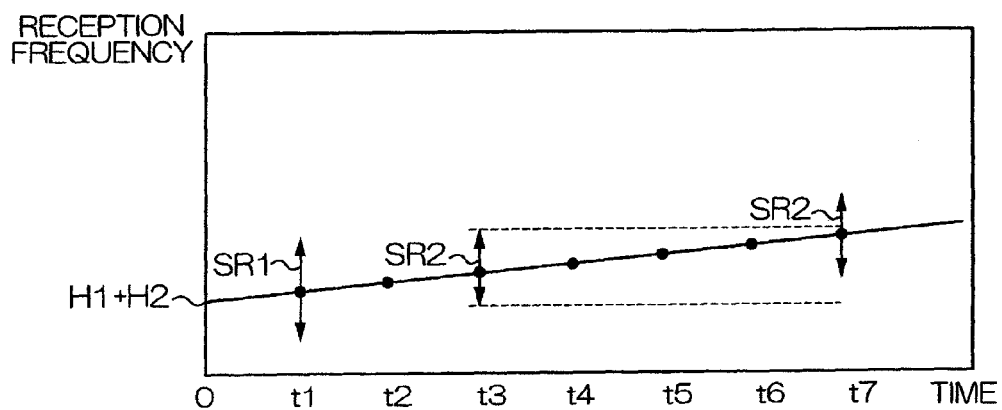
FIG. 18 is another view illustrative of the process based on the search range update program.

On the other hand, when the amount of change in the reception frequency is small as shown in FIG. 18, the reception frequency does not fall outside the search range SR2 until the second drift df2 is again calculated.

Whether or not the reception frequency falls outside the search range SR2 until the second drift df2 is again calculated is determined depending on the amount of change in the reception frequency (i.e., the amount of change in the drift of the local oscillator 34a).

Figure 19:
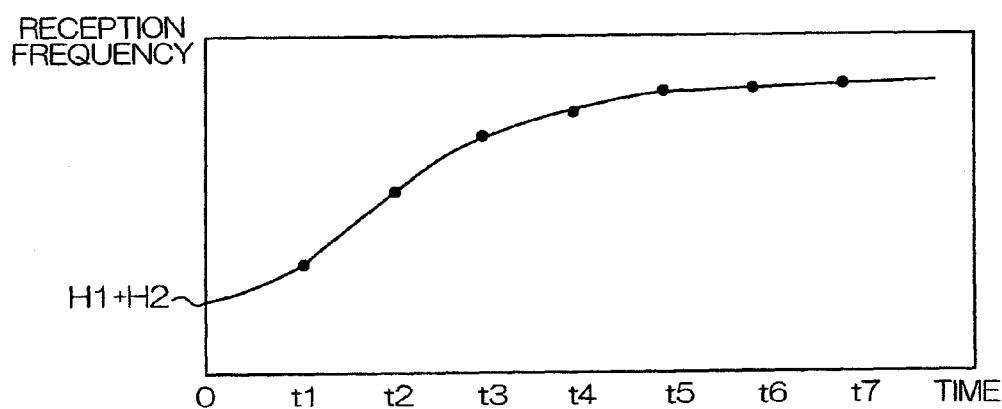
FIG. 19 is another view illustrative of the process based on the search range update program.

As shown in FIG. 19, the reception frequency changes to draw a curve in the actual situation. Since a change in temperature decreases when a specific period of time has elapsed after activating the GPS device 34, a change in drift also decreases, whereby a change in reception frequency decreases.

Figure 20:
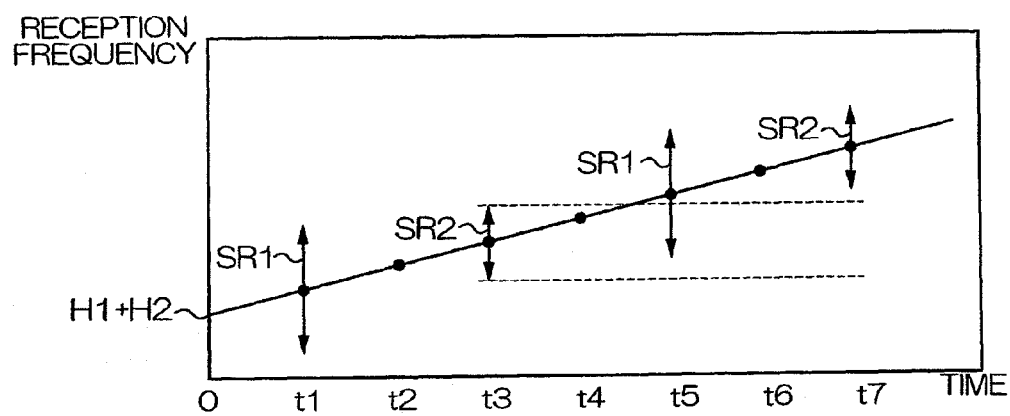
FIG. 20 is another view illustrative of the process based on the search range update program.

As shown in FIG. 20, when the control section 100 has determined that the amount of change Δdf1 is larger than the drift error β2, the control section 100 calculates the first search range SR1 at a time t5 and sets the first search range SR1 to be a new search range.

This cancels a situation in which the reception frequency falls outside the search range.

Figure 21:
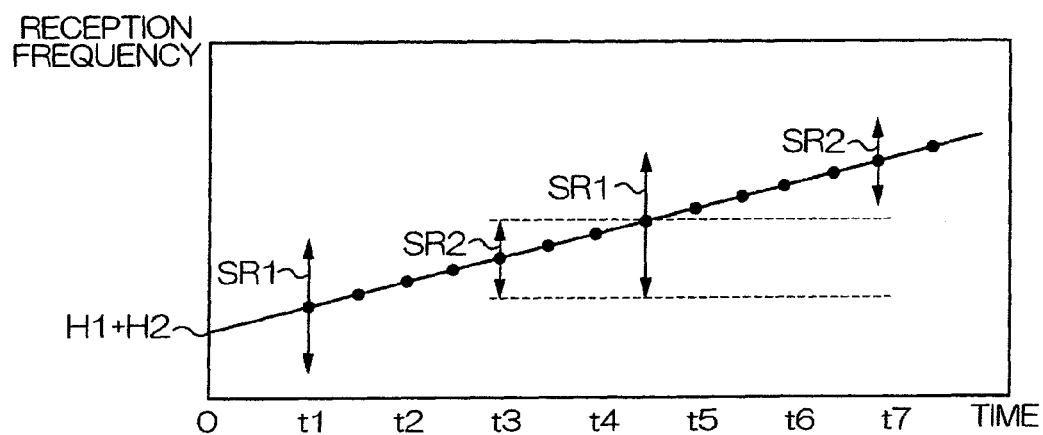
FIG. 21 is another view illustrative of the process based on the search range update program.

As shown in FIG. 21, a situation in which the reception frequency falls outside the search range is canceled in an earlier stage as the calculation time interval of the first drift df1 is reduced.

Figure 22:
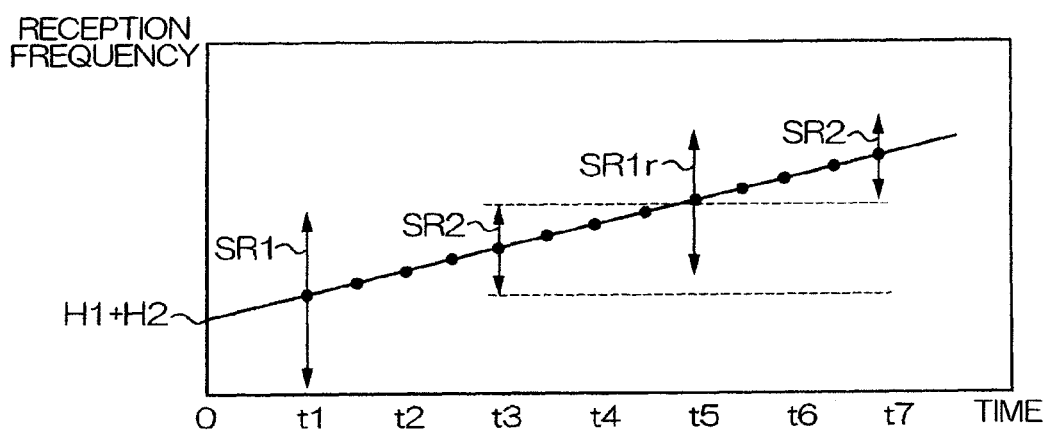
FIG. 22 is yet another view illustrative of the process based on the search range update program.

As shown in FIG. 22, the search range can be made narrow by performing the second update operation at the time t5, for example. The search range updated by the second update operation is a search range SR1r.

The search range updated by the basic update operation is the search range SR2, and the search range updated by the first update operation is the search range SR1.

The search range SR1r is wider than the search range SR2 and is narrower than the search range SR1.

As shown in FIG. 6, the terminal 20 stores a positioning program 128 in the first storage section 110. The positioning program 128 is a program for causing the control section 100 to locate the present position using the signals S1 and the like and calculate a located position P1.

The control section 100 stores located position information 170 indicating the located position P1 in the second storage section 150.

As shown in FIG. 6, the terminal 20 stores a located position output program 130 in the first storage section 110.

The located position output program 130 is a program for causing the control section 100 to display the located position P1 on the display device 36.

The terminal 20 is configured as described above.

The terminal 20 can update the search range using the first drift df1 during a period between the calculation timings of the second drift df2. Specifically, the duration of a situation in which the reception frequency is positioned outside the search range due to a change in drift can be reduced during a period between the calculation timings of the second drift df2 (i.e., during a period between the reception timings of a signal from the strong satellite).

The search range is updated using the first drift df1 only during a period between the calculation timings of the second drift df2. This means that the search range is updated using the second drift df2 when the second drift df2 is again calculated. The drift error α2 of the second drift df2 is smaller than the drift error α1 of the first drift df1.

Therefore, an increase in the search range caused by using the first drift df1 calculated using the reference frequency Hr can be limited. Specifically, when performing the second update operation, an increase in the search range can be limited even if the search range is updated utilizing the first drift df1.

This enables the duration of a situation in which the reception frequency falls outside the search range due to a change in drift to be reduced during a period between the calculation timings of the second drift df2 while limiting an increase in the search range due to utilization of the first drift df1.

The search range is updated using the first drift when the amount of change Δdf1 in the first drift is larger than the drift error α2 of the second drift df2.

When updating the search range using the second drift df2, the center frequency of the search range is specified based on the second drift df2, and the bandwidth of the search range is specified based on the drift error α2 of the second drift df2.

Although the drift error α1 of the first drift df1 is usually larger than the drift error α2 of the second drift df2, the amount of change Δdf1 in the first drift df1 has a certain reliability. When the amount of change Δdf1 in the first drift df1 is larger than the drift error α2 of the second drift df2, the reception frequency may fall outside the search range due to a change in drift.

Since the terminal 20 updates the search range using the first drift when the amount of change Δdf1 in the first drift is larger than the drift error α2 of the second drift df2, the duration of a situation in which the reception frequency falls outside the search range can be reduced.

The first drift df1 includes the error of the reference frequency Hr.

On the other hand, since the second drift df2 is not calculated using the reference frequency Hr, the second drift df2 does not include the error of the reference frequency Hr.

Since the second drift df2 and the first drift df1 differ by the error of the reference frequency Hr, the difference P between the first drift df1 and the second drift df2 indicates the error of the reference frequency Hr.

The terminal 20 can calculate the VCO correction value βav by averaging the differences β (VCO errors β). Since the error during the calculation process of the difference P can be reduced by averaging the differences β, the VCO correction value βav has a high accuracy.

This allows the terminal 20 to acquire a highly accurate error correction value of the reference frequency Hr.

The terminal 20 can perform the second update operation using the VCO correction value βav. This eliminates the error of the reference frequency Hr when updating the search range by the intermediate update operation, whereby the search range can be made narrow in comparison with the related-art technology when using the reference frequency.

The configuration of the terminal 20 according to this embodiment has been described above. An operation example of the terminal 20 is described below mainly using FIGS. 23, 24, and 25.

Figure 23:
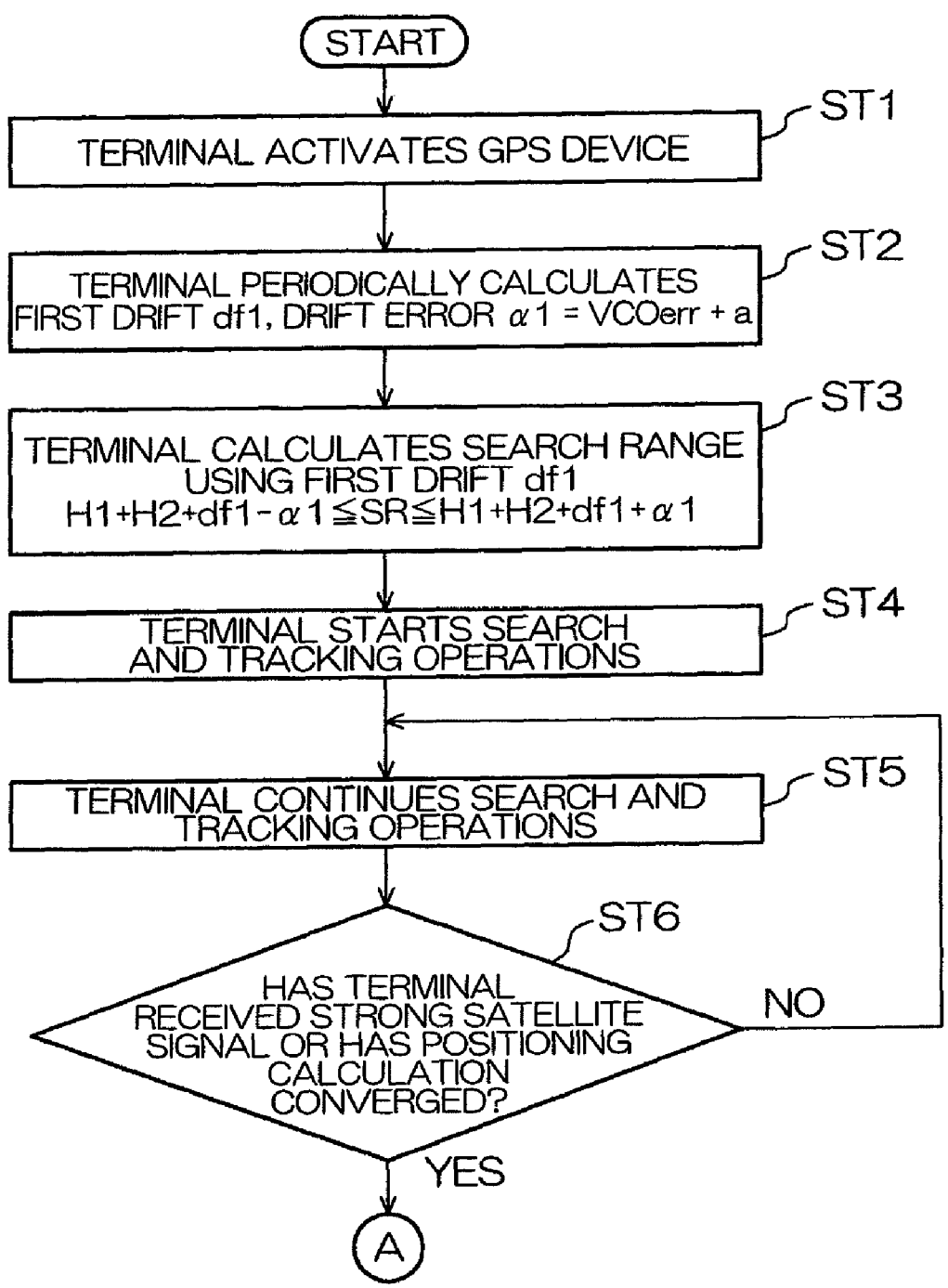
FIG. 23 is a schematic flowchart showing an operation example of the terminal.
Figure 24:
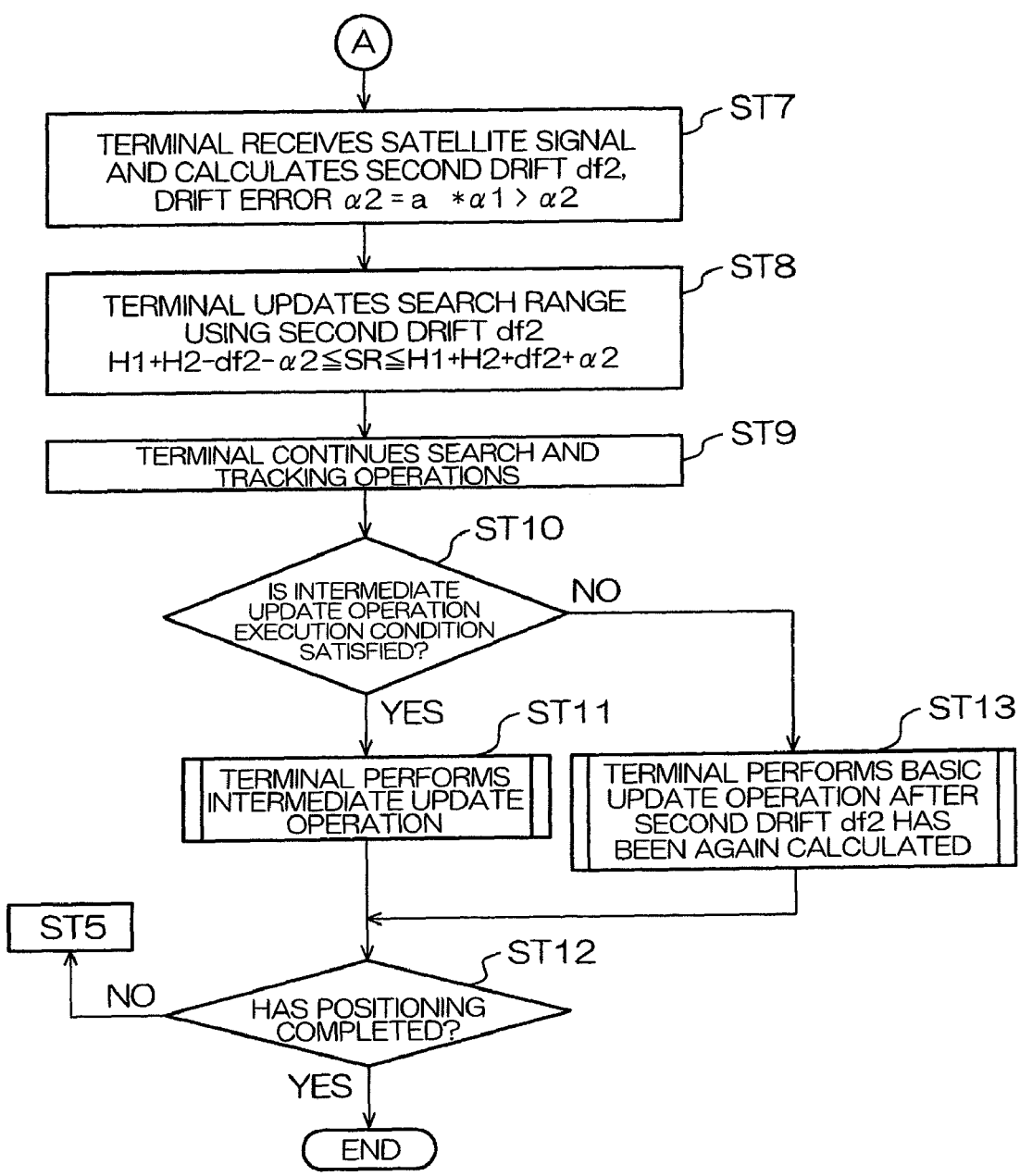
FIG. 24 is another schematic flowchart showing an operation example of the terminal.
Figure 25:
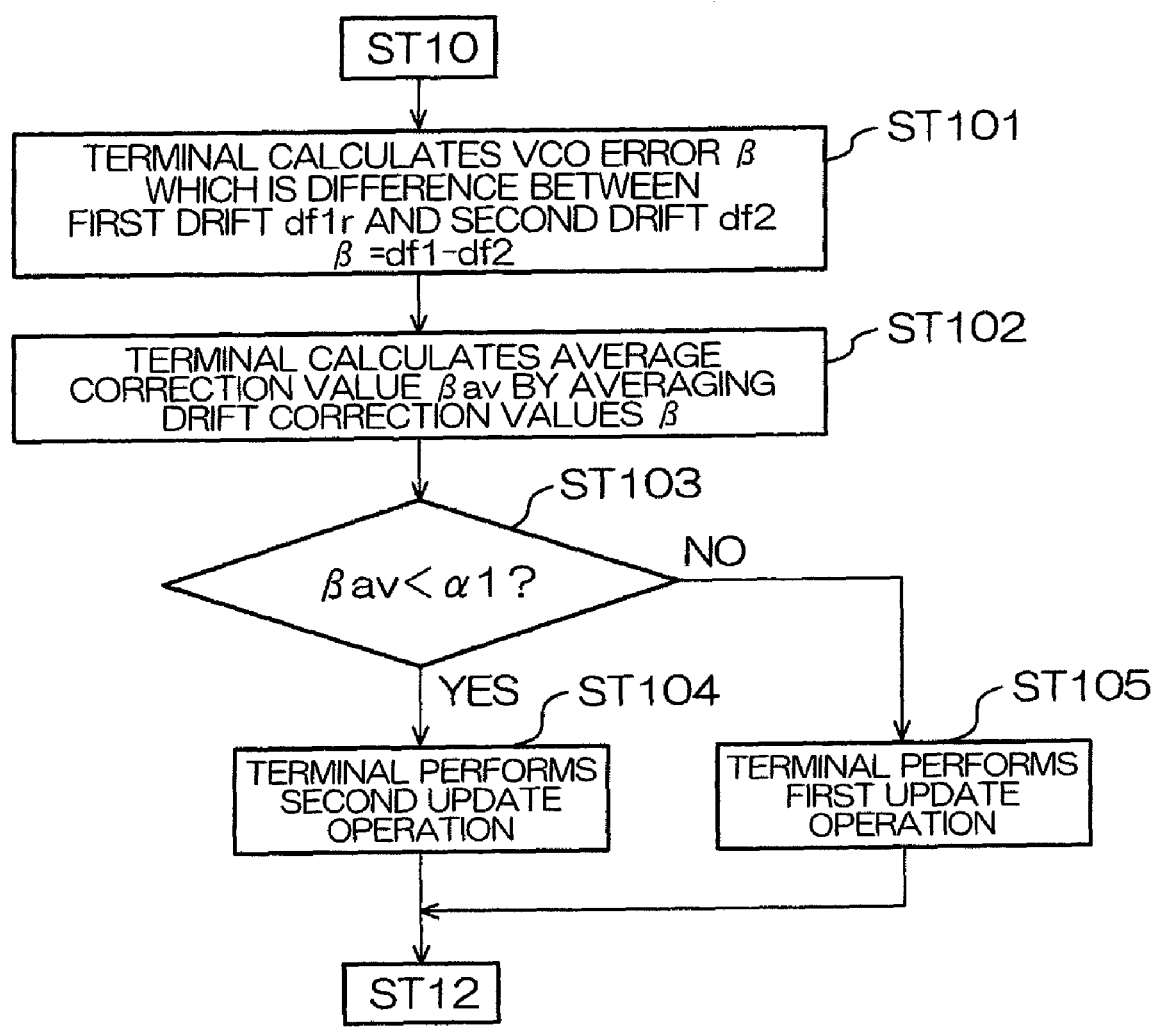
FIG. 25 is yet another schematic flowchart showing an operation example of the terminal.

FIGS. 23 to 25 are schematic flowcharts showing an operation example of the terminal 20 according to this embodiment.

The terminal 20 activates the GPS device 34 (step ST1 in FIG. 23).

The terminal 20 calculates the first drift df1 (step ST2). The terminal 20 periodically carries out the step ST2 during operation of the GPS device 34.

The terminal 20 calculates the first search range SR1 using the first drift df1 (step ST3).

The terminal 20 starts the search and tracking operations (step ST4). The terminal 20 searches for each of the satellites 12a and the like, and tracks the satellite for which the search operation has been completed.

The terminal 20 continues the search and tracking operations (step ST5). The terminal 20 continues searching for the satellite for which the search operation has not been completed, and tracking the satellite for which the search operation has been completed.

The terminal 20 determines whether or not the terminal 20 has received a signal from the strong satellite or the positioning calculation has converged (step ST6).

When the terminal 20 has determined that the terminal 20 has not received a signal from the strong satellite and the positioning calculation has not converged in the step ST6, the terminal 20 returns to the step ST5.

When the terminal 20 has determined that the terminal 20 has received a signal from the strong satellite or the positioning calculation has converged in the step ST6, the terminal 20 calculates the second drift df2 (step ST7 in FIG. 24).

The terminal 20 updates the search range using the second drift df2 (step ST8).

The terminal 20 continues the search and tracking operations (step ST9).

The terminal 20 determines whether or not the intermediate update operation execution condition is satisfied (step ST10). Specifically, the terminal 20 determines whether or not the amount of change Δdf1 is larger than the drift error α2.

When the terminal 20 has determined that the intermediate update operation execution condition is satisfied in the step ST10, the terminal 20 performs the intermediate update operation (step ST11).

The details of the intermediate update operation (step ST11) are described below with reference to FIG. 25.

The terminal 20 calculates the VCO error P (step ST101 in FIG. 25).

The terminal 20 calculates the VCO correction value βav (step ST102).

The terminal 20 determines whether or not the VCO correction value βav is larger than the drift error β1 of the drift df1 (step ST103).

When the terminal 20 has determined that the VCO correction value βav is smaller than the drift error α1 of the drift df1 in the step ST103, the terminal 20 performs the second update operation (step ST104).

When the terminal 20 has determined that the VCO correction value βav is equal to or larger than the drift error α1 of the drift df1 in the step ST103, the terminal 20 performs the first update operation (step ST105).

After completion of the step ST11, the terminal 20 determines whether or not to positioning has completed (step ST12). When the terminal 20 has determined that positioning has completed, the terminal 20 finishes the operation. When the terminal 20 has determined that positioning has not completed, the terminal 20 repeats the step ST5 and the subsequent steps. The terminal 20 determines whether or not to positioning has completed depending on whether or not a predetermine time (120 seconds) has expired, for example.

When the terminal 20 has determined that the intermediate update operation execution condition is not satisfied in the step ST10 in FIG. 24, the terminal 20 performs the basic update operation after the second drift df2 has been again calculated (step ST13).

The above steps enable the duration of a situation in which the reception frequency falls outside the search range due to a change in drift to be reduced during positioning while limiting an increase in the search range caused by using the first drift df1.

The terminal 20 can acquire a highly accurate error correction value of the reference frequency Hr.

The terminal 20 can perform the second update operation using the VCO correction value βav. This eliminates the error of the reference frequency Hr when updating the search range by the intermediate update operation, whereby the search range can be made narrow in comparison with the related-art technology.

Second Embodiment

A second embodiment is described below.

A terminal 20A according to the second embodiment is mainly configured in the same manner as the terminal 20 according to the first embodiment. Therefore, the same sections are indicated by the same symbols, and description thereof is omitted. The following description mainly focuses on the difference from the terminal 20 according to the first embodiment.

Figure 26:
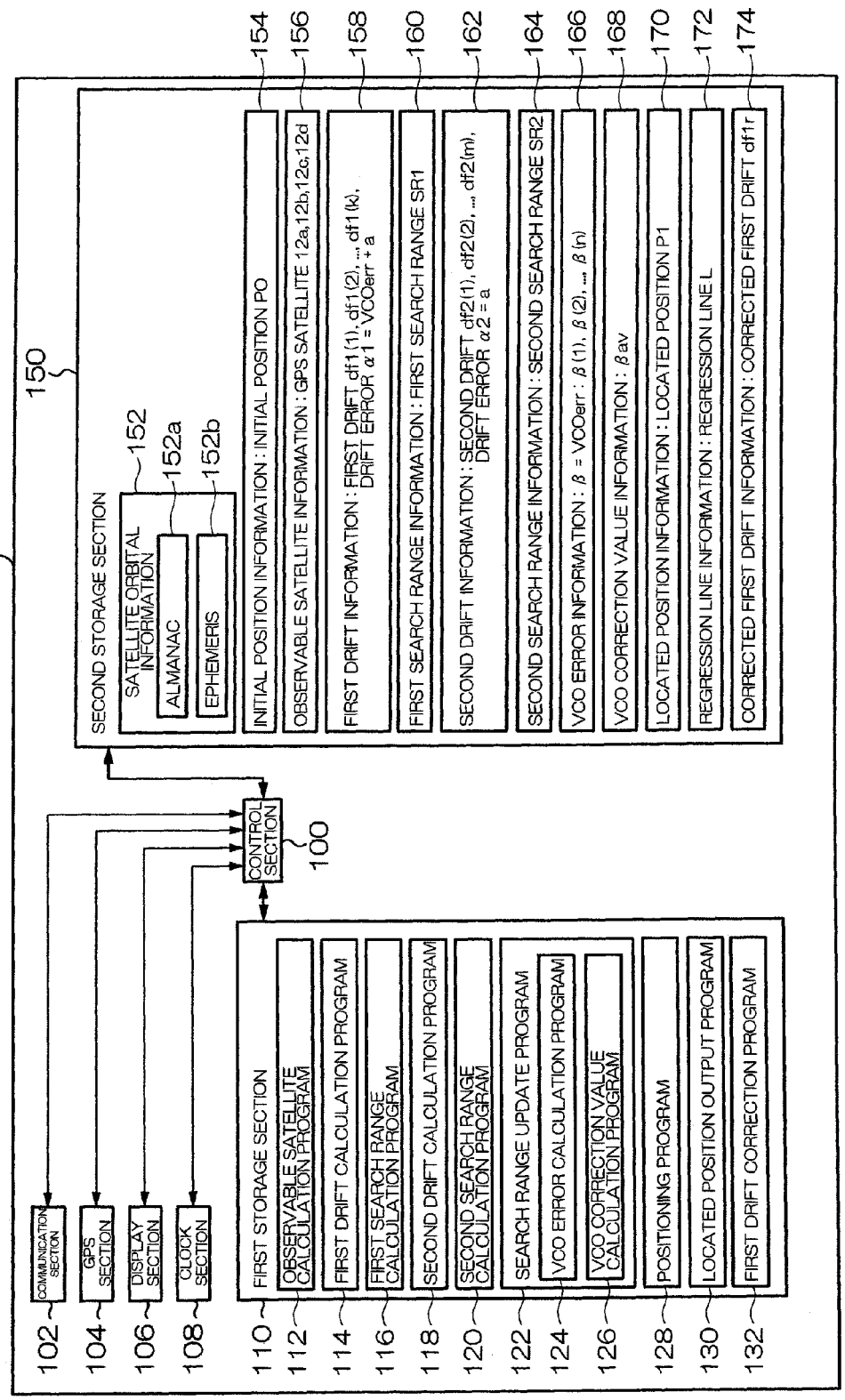
FIG. 26 is a schematic view showing the main software configuration of another terminal.

FIG. 26 is a schematic view showing the main software configuration of the terminal 20A.

As shown in FIG. 26, the terminal 20A stores a first drift correction program 132 in the first storage section 110.

Figure 27:
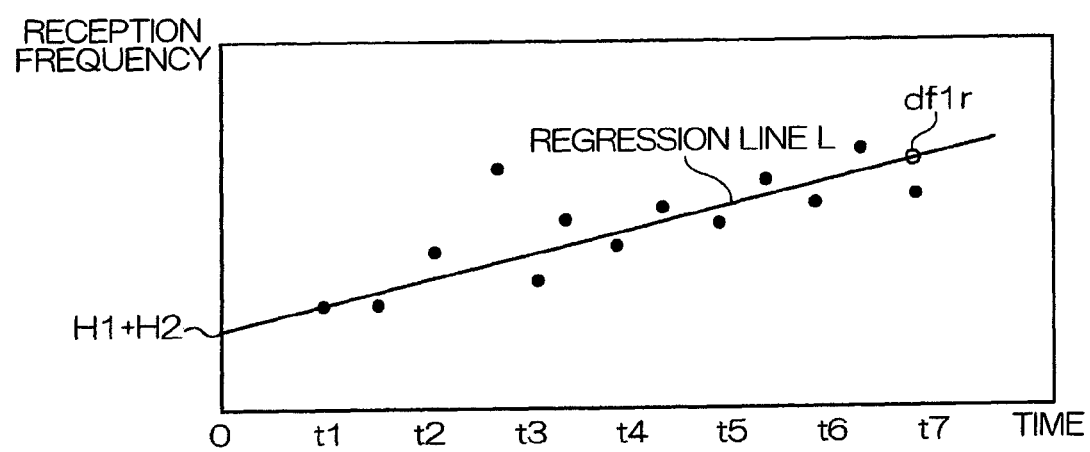
FIG. 27 is a view illustrative of the process based on a first drift correction program.

FIG. 27 is a view illustrative of the process based on the first drift correction program 132.

As shown in FIG. 27, the control section 100 calculates a regression line L based on the first drifts df1 held as the first drift information 158. The latest first drift is the first drift df1(7) calculated at the present time t7, for example.

The control section 100 stores regression line information 172 indicating the regression line L in the second storage section 150.

The control section 100 calculates the frequency on the regression line corresponding to the present time t7 as a corrected first drift df1r. The corrected first drift df1r exemplifies a corrected first drift.

The control section 100 stores corrected first drift information 174 indicating the calculated corrected first drift df1r in the second storage section 150.

The first drift correction program 132 and the control section 100 function as a first drift correction section.

The control section 100 may calculate the average value of all of the held first drifts df1 and use the average value as the corrected first drift df1r, differing from this embodiment.

The control section 100 calculates the difference between the corrected first drift df1r and the second drift df2 according to the VCO error calculation program 124.

This reduces the effects of the error during the calculation process of the first drift df1. In particular, a phenomenon has been confirmed in which the first drift df1 changes to a large extent during high-speed movement or handover of the base station 40. This embodiment is effective for the case where the first drift df1 changes to a large extent.

Since the difference between the corrected first drift df1r and the second drift df2 is calculated, the accuracy of the VCO correction value βav can be further improved. As a result, the time to first fix (TTFF) determined by a simulation was reduced to 30 seconds (s) from 50 seconds (s).

Third Embodiment

A third embodiment is described below.

A terminal 20B according to the second embodiment is mainly configured in the same manner as the terminal 20A according to the second embodiment. Therefore, the same sections are indicated by the same symbols, and description thereof is omitted. The following description mainly focuses on the difference from the terminal 20A according to the second embodiment.

Figure 28:
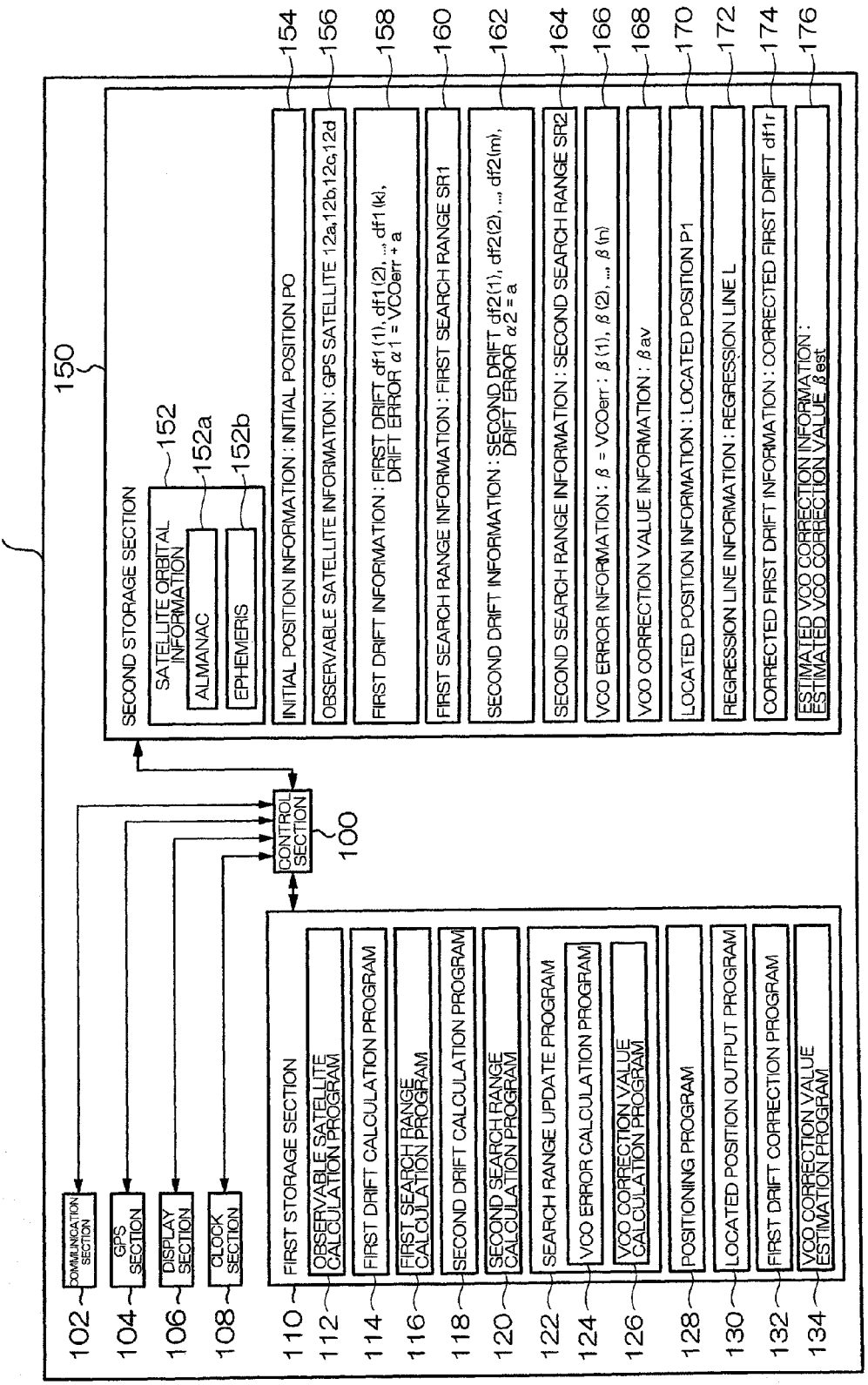
FIG. 28 is a schematic view showing the main software configuration of another terminal.

FIG. 28 is a schematic view showing the main software configuration of the terminal 20B.

As shown in FIG. 28, the terminal 20B stores a VCO correction value estimation program 134 in the first storage section 110.

FIG. 29 is a view illustrative of the process based on the VCO correction value estimation program 134.

The control section 100 calculates an elapsed time Δt from the calculation of the preceding VCO correction value βav, and estimates the VCO correction value βav at the present time by calculating an estimated VCO correction value Pest according to an expression 9.

The control section 100 stores estimated VCO correction value information 176 indicating the calculated estimated VCO correction value pest in the second storage section 150.

The control section 100 calculates the difference β (VCO error β) between the corrected first drift df1r and the estimated VCO correction value pest according to the VCO error calculation program 124.

Therefore, the accuracy of the difference β can be improved even when using the preceding VCO correction value βav. The VCO correction value βav has a specific valid period. The valid period is 120 seconds (s), for example. The valid period is specified by the positioning duration.

The control section 100 performs the basic update operation without calculating the difference β when a valid VCO correction value βav does not exist.

(Program, Computer-Readable Recording Medium, and the Like)

A control program for causing a computer to execute each step of the above operation example may be provided.

A computer-readable recording medium or the like storing such a control program may also be provided.

A program storage medium used to install the control program or the like in a computer to allow the control program or the like to be executable by the computer may be implemented by a packaging medium such as a flexible disk such as a floppy disk®, a compact disk read only memory (CD-ROM), a compact disk-recordable (CD-R), a compact disk-rewritable (CD-RW), or a digital versatile disk (DVD), a semiconductor memory, a magnetic disk, or a magnetooptical disk in which the program is stored temporarily or permanently, or the like.

The invention is not limited to the above embodiments.

Although only some embodiments of the invention have been described above in detail, those skilled in the art would readily appreciate that many modifications are possible in the embodiments without materially departing from the novel teachings and advantages of the invention. Accordingly, such modifications are intended to be included within the scope of the invention.

What is claimed is:

1. A method implemented by a terminal device that receives satellite signals from a plurality of satellite positioning system (SPS) satellites and locates a position, the method comprising:
    outputting a reference frequency from an oscillator of the terminal device;
    periodically calculating a drift of an output frequency of a local oscillator of the terminal device, the local oscillator being different from the oscillator, the drift of the output frequency of the local oscillator being calculated as a first drift using the reference frequency that is output from the oscillator and the output frequency of the local oscillator, an oscillation frequency of the oscillator being continually corrected;
    calculating a search range of a reception frequency of the satellite signal using a transmission frequency of the satellite signal, a Doppler shift, and the first drift;
    calculating a drift of the output frequency of the local oscillator as a second drift using an estimated reception frequency that is estimated based on the transmission frequency of the satellite signal and the Doppler shift and a reception frequency when the satellite signal has been received;
    calculating a difference between the first drift and the second drift as a reference frequency error that is an error of the reference frequency;
    calculating an error correction value of the reference frequency based on a plurality of the reference frequency errors;
    selecting a search range update method using an amount of change in the first drift and the error correction value;
    updating the search range using the search range update method that has been selected;
    searching the satellite signal within the search range, and receiving the satellite signal;
    calculating a position of the terminal device based on the satellite signal; and
    recording the position in the terminal device.

2. The method as defined in claim 1, further comprising correcting the first drift based on a tendency of a change in the first drift with respect to elapsed time.

3. The method as defined in claim 2, wherein correcting the first drift includes generating a regression line based on a plurality of the first drifts, and calculating the first drift on the regression line corresponding to a present time.

4. The method as defined in claim 1, wherein
    selecting the search range update method includes
        determining whether or not to perform a basic update operation that updates the search range using the second drift and an error of the second drift set in advance based on a relationship between the amount of change in the first drift and the error of the second drift, and
        determining whether to perform a first update operation that updates the search range using the first drift and an error of the first drift set in advance or a second update operation that updates the search range using the first drift, the error of the first drift, and the error correction value, based on a relationship between the error correction value and the error of the first drift.

5. A terminal device that receives satellite signals from a plurality of satellite positioning system (SPS) satellites and locates a position, the terminal device comprising:
    an oscillator that outputs a reference frequency, an oscillation frequency of the oscillator being continually corrected;
    a local oscillator that outputs a frequency signal used to receive the satellite signal, the local oscillator being different from the oscillator;
    a first drift calculation section that periodically calculates a drift of an output frequency of the local oscillator as a first drift using the reference frequency and the output frequency of the local oscillator;
    a search range calculation section that calculates a search range of a reception frequency of the satellite signal using a transmission frequency of the satellite signal, a Doppler shift, and the first drift;
    a second drift calculation section that calculates a drift of the output frequency of the local oscillator as a second drift using an estimated reception frequency that is estimated based on the transmission frequency of the satellite signal and the Doppler shift and a reception frequency when the satellite signal has been received;
    a reference frequency error calculation section that calculates a difference between the first drift and the second drift as a reference frequency error that is an error of the reference frequency;
    an error correction value calculation section that calculates an error correction value of the reference frequency based on a plurality of the reference frequency errors;
    an update method selection section that selects a search range update method using an amount of change in the first drift and the error correction value;
    a search range update section that updates the search range using the search range update method that has been selected by the update method selection section;
    a reception section that searches the satellite signal within the search range, and receives the satellite signal; and
    a positioning section that calculates a position of the terminal device based on the satellite signal.

6. The terminal device as defined in claim 4, further comprising
    a first drift correction section that corrects the first drift based on a tendency of a change in the first drift with respect to elapsed time.

7. The terminal device as defined in claim 6, wherein the first drift correction section corrects the first drift by generating a regression line based on a plurality of the first drifts, and calculates the first drift on the regression line corresponding to a present time.

8. The terminal device as defined in claim 5, wherein
    the update method selection section determining whether or not to perform a basic update operation that updates the search range using the second drift and an error of the second drift set in advance based on a relationship between the amount of change in the first drift and the error of the second drift, and determining whether to perform a first update operation that updates the search range using the first drift and an error of the first drift set in advance or a second update operation that updates the search range using the first drift, the error of the first drift, and the error correction value, based on a relationship between the error correction value and the error of the first drift.

9. A computer-readable recording medium storing a program that is executed by a computer included in a terminal device that receives satellite signals from a plurality of satellite positioning system (SPS) satellites and locates a position, the program causing the computer to:

periodically calculate a drift of an output frequency of a local oscillator as a first drift using a reference frequency that is output from a given oscillator different from the local oscillator and the output frequency of a local oscillator, an oscillation frequency of the oscillator being continually corrected;

calculate a search range of a reception frequency of the satellite signal using a transmission frequency of the satellite signal, a Doppler shift, and the first drift;

calculate a drift of the output frequency of the local oscillator as a second drift using an estimated reception frequency that is estimated based on the transmission frequency of the satellite signal and the Doppler shift and a reception frequency when the satellite signal has been received;

calculate a difference between the first drift and the second drift as a reference frequency error that is an error of the reference frequency;

calculate an error correction value of the reference frequency based on a plurality of the reference frequency errors;

select a search range update method using an amount of change in the first drift and the error correction value;

update the search range using the search range update method that has been selected;

search the satellite signal within the search range, and receive the satellite signal; and calculate a position based on the satellite signal.

10. The recording medium as defined in claim 9, wherein the program causes the computer to correct the first drift based on a tendency of a change in the first drift with respect to elapsed time.

11. The recording medium as defined in claim 10, wherein the first drift is corrected by generating a regression line based on a plurality of the first drifts, and calculates the first drift on the regression line corresponding to a present time.

12. The recording medium as defined in claim 9, wherein selecting the search range update method includes determining whether or not to perform a basic update operation that updates the search range using the second drift and an error of the second drift set in advance based on a relationship between the amount of change in the first drift and the error of the second drift, and determining whether to perform a first update operation that updates the search range using the first drift and an error of the first drift set in advance or a second update operation that updates the search range using the first drift, the error of the first drift, and the error correction value, based on a relationship between the error correction value and the error of the first drift.

* * * * *